United States Patent [19]
Yamada et al.

[11] Patent Number: 6,163,029
[45] Date of Patent: Dec. 19, 2000

[54] RADIATION DETECTOR, RADIATION DETECTING METHOD AND X-RAY DIAGNOSING APPARATUS WITH SAME RADIATION DETECTOR

[75] Inventors: Shinichi Yamada; Michitaka Honda; Masayuki Nishiki; Kunio Aoki; Takuya Sakaguchi, all of Tochigi, Japan

[73] Assignee: Kabushiki Kaisha Toshiba, Kawasaki, Japan

[21] Appl. No.: 09/158,285

[22] Filed: Sep. 22, 1998

[30] Foreign Application Priority Data

Sep. 22, 1997 [JP] Japan ................................. 9-257311
Jun. 2, 1998 [JP] Japan ................................ 10-153294

[51] Int. Cl.⁷ .................................................. G01T 1/24
[52] U.S. Cl. ................................. 250/370.09; 250/370.01
[58] Field of Search ........................ 250/370.09, 370.1

[56] References Cited

U.S. PATENT DOCUMENTS

| | | | |
|---|---|---|---|
| 4,675,739 | 6/1987 | Catchpole et al. | 358/213.11 |
| 4,689,487 | 8/1987 | Nishiki et al. | 250/370.09 |
| 4,727,256 | 2/1988 | Kumazawa | 250/370.09 |
| 5,084,639 | 1/1992 | Ribner | 250/370.09 |
| 5,103,092 | 4/1992 | Takahashi et al. | 250/252.1 |
| 5,113,077 | 5/1992 | Shimizu et al. | 250/370.11 |
| 5,319,206 | 6/1994 | Lee et al. | |
| 5,652,430 | 7/1997 | Lee | 250/370.09 |
| 5,677,940 | 10/1997 | Suzuki et al. | 378/38 |
| 5,693,947 | 12/1997 | Morton | 250/370.09 |
| 5,825,033 | 10/1998 | Barrett et al. | 250/370.1 |
| 5,852,296 | 12/1998 | Tsukamoto et al. | 250/370.09 |

FOREIGN PATENT DOCUMENTS 4-271677 9/1992 Japan.
4-329934 11/1992 Japan.

*Primary Examiner*—Constantine Hannaher
*Assistant Examiner*—Otilia Gabor
*Attorney, Agent, or Firm*—Oblon, Spivak, McClelland, Maier & Neustadt, P.C.

[57] ABSTRACT

According to information input through a keyboard, an X-ray irradiation condition selecting portion selects an X-ray irradiation condition, retrieves a correspondence table according to this X-ray irradiation condition so as to read out a gain control state suitable for an irradiation condition, and drives an analog SW setting portion. According to a signal from the analog SW setting portion, an integration capacity of an initial stage integration amplifier is changed over. Further, according to other mode, accumulated electric charge Q of a picture element Cp is read out on a signal line and converted to a voltage Vo by the integration amplifier. By appropriately determining a sampling time by a sample/hold circuit after electric charge is read out, an influence of a switching element resistance can be excluded from a voltage Vx. Therefore, the voltage Vx can be sample held stably. Further, because the integration circuit has a characteristic of damping a high frequency noise generated in the integration amplifier, the S/N ratio of the voltage Vx can be improved.

55 Claims, 19 Drawing Sheets

CASE OF NOT EFFECTIVE USE

CASE OF SATURATION

RESET SWITCH OFF    SAMPLE TIMING

RADIATION DETECTOR, RADIATION DETECTING METHOD AND X-RAY DIAGNOSING APPARATUS WITH SAME RADIATION DETECTOR

BACKGROUND OF THE INVENTION

1. Field of the Invention

This invention relates to a radiation detector, a radiation detecting method and an X-ray diagnosing apparatus provided with the same radiation detector, and more particularly to an art for improving fluoroscopy image quality and reducing signal noise.

2. Description of the Prior Art

Conventionally, as an image detector, an X-ray fluoroscopy/radiography apparatus provided with an image intensifier (I.I)-TV camera system has been used.

In cardiovascular inspection with an X-ray fluoroscopy/radiography apparatus provided with I.I-TV system, panning of an imaging object is accompanied and fluoroscopy is carried out for a portion in which an X-ray low absorption region such as lung field, diaphragm and the like and an X-ray high absorption region including the heart exist mixedly. To prevent halation in the X-ray low absorption region and improve fluoroscopy image quality, conventionally, such mechanical filters as an electric collimator, electric compensation filter and the like have been used. However, an operation of the mechanical filter must be carried out each time when an image angle is changed and thus the operation is very complicated.

Therefore, as a method for improving the fluoroscopy image quality, recently "Automatic Brightness Correcting Method for X-ray Imaging Apparatus" (Japanese Patent Application Laid-Open No. 4-32993), and "Dynamic Compression Method for X-ray Recording and Apparatus therefor" (Japanese Patent Application Laid-Open No. 4-271677) have been proposed.

Further, recently, as an X-ray solid flat panel detector using semiconductor production technology, an indirect conversion type X-ray solid flat panel detector (U.S. Pat. No. 4,689,487, etc.) and direct conversion type X-ray solid flat panel detector (U.S. Pat. No. 5,319,206, etc.) have been proposed.

In this indirect conversion type X-ray solid flat panel detector, the X-ray is converted to visible light through an intensifying paper or a chemical substance like cesium iodide (CsI), an intensity of this visible light is converted to electric charge by photoelectric conversion action of a photo diode and this electric charge is accumulated in a capacitance of each picture element.

Then, accumulated electric charge is successively read out by a switching means like a thin film transistor (hereinafter referred to as TFT) matrix and converted to a voltage by a charge amplifier (called initial stage integration amplifier also). Then, this voltage is analog/digital converted so as to obtain a digital image signal (see FIG. 1).

On the other hand, in the direct conversion type X-ray solid flat panel detector, the X-ray impinging upon a semiconductor like a selenium (Se) under a high electric field contributes to generation of electric charge by direct photoelectric effect and this electric charge is accumulated in a signal accumulated capacitance of each picture element. FIG. 2 shows a schematic sectional view thereof. Like the indirect conversion type, the accumulated electric charge is read out successively by switching of the TFT, converted to a voltage by an integration amplifier (not shown) and further analog-digital converted so as to obtain a digital image signal.

FIG. 3B shows changes of the number of electrons generated per unit absorption energy when the bias voltage Vb is changed between 1000 V and 1700 V in amorphous-selenium (a-Se) having a film thickness of $d_{se}=160$ $\mu$m shown in FIG. 3A. (for reference: "X-ray imaging using amorphous selenium: Determination of X-ray sensitivity by pulse height spectroscopy", J. A. Rowlands, G. DeCrescenzo, and N. Araj, Medical Physics VOL. 19, No. 4, pp 1065–1069, July/August 1992).

However, with respect to X-ray imaging apparatus using method, X-ray condition, namely, an X-ray amount (mAs) which is a product of X-ray tube current and exposure time differs largely between fluoroscopy and radiography, and an amount of electric charge accumulated in each picture element of the X-ray solid flat panel detector differs in each condition.

For example, there is a difference several hundreds times in terms of maximum electric charge amount accumulated in a single picture element, between fluoroscopy and radiography conditions. Therefore, in a signal range like fluoroscopy condition, having a small amount of electric charge, a digital data valid maximum range of an A/D converter (hereinafter referred to as ADC) cannot be sufficiently utilized, so that its signal resolution after the digital conversion drops, which is a problem of the conventional art.

In the conventional fluoroscopy image quality improving method, if light intensity from the I.I is over a dynamic range of a camera, there is no way for improvement because this method is a method for applying various processings to a video signal after an output of the image intensifier is taken by a TV camera.

On the other hand, in a conventional X-ray solid flat panel detector, a relation of an output signal with respect to input X-ray is almost linear and uniform in terms of a plane of a flat panel and this relation cannot be changed depending on a two-dimensional region of an detection plane.

Further, the conventional X-ray solid flat panel detector has the following problem about signal noise.

FIG. 4 is a diagram showing a picture element circuit composed of photoelectric elements and switching elements disposed in the matrix. The picture element is indicated by a capacitor Cp for accumulating electric charge as an equivalent circuit. If the X-ray is irradiated, the electric charge Q accumulated in the picture element Cp is sent to a signal line 112 at a timing in which a switching element 111 like TFT is turned on. The electric charge sent to the signal line 112 is converted to a voltage Vo by an integration amplifier (integration circuit comprising an operational amplifier 131 and a capacitor Cf) and this voltage Vo is accumulated and sample held in the capacitor C by turning on a switch 141 for sampling of a sample/hold circuit 114.

It has been known that noise superimposed on the output voltage Vo of the integration amplifier 113 is given in a formula below and this is described in a marketed data sheet.

$$\text{noise} = (\text{noise caused in the integration amplifier}) \times [1+(Cs/Cf)] \quad (1)$$

Here, Cs is a capacitance component from a switching element up to input of the integration amplifier 113 and includes a stray capacitance of the signal line 112. Cf is a capacitance component for supplying a relation between output voltage Vo of the integration amplifier and input electric charge Q and is given in the form of Vo=−Q/Cf.

As evident from the formula (1), in the conventional circuit, it is necessary to improve the performance of the integration amplifier 113 and reduce Cs in order to reduce noise.

However, not only the Cs cannot be reduced to zero but also it increases if the signal line 112 for carrying the electric charge Q of each picture element Cp disposed in the matrix is extended, so that there is a limit in reduction of noise. Further, even if Cs is designed so as to be small enough, the Cs cannot be reduced below noise component of the integration amplifier 113. Then, that noise is automatically determined by the performance of the FET on an initial stage composing the integration amplifier 113. The FET performance also has a limit and a low noise FET is expensive and difficult to mass produce.

A countermeasure shown in FIG. 5 for the above condition has been described in "CMOS low noise amplifier for microstrip readout design and results", Nuclear Instruments and Method in Physics Research A301 (1991).

Referring to FIG. 5, a shaping circuit 115 for noise reduction surrounded by broken line is inserted after the integration amplifier 113. Consequently, an interval between the integration amplifier 113 and sample/hold circuit 114 has following frequency characteristic.

$$F(\omega) = a \cdot \omega / SQR(\omega^2 + b^2) \quad (2)$$

SQR indicates a root sign, and a=Cd/Cx, b=1/(Cx-Rx) and ω is an angular frequency component of a signal to be input to this circuit.

According to this formula (2), noise in low frequency component can be removed by the shaping circuit 115, noise of sampling time is reduced. Further, the same reference describes a circuit in which an integrator comprising a capacitor and a resistor is provided after the shaping circuit 115 and by providing with such an integrator, there is an effect that even high frequency noise can be removed.

The circuit shown in FIG. 5 is designed to successively detect electric charge caused by radiation arriving in the form of pulse like in a gamma radiation detector. As shown in FIG. 6A, the wave shape of the output voltage Vx of the shaping circuit 115 becomes pulse-like. At this time, the output signal Vo of the integration amplifier 113 is as shown in FIG. 6B and damps with a passage of time. A position of a pulse signal shown in FIG. 6A depends on a resistance existing on the signal line 112. Further, its peak value is determined by this resistance and electric charge amount Q which is a signal source. Therefore, if the resistance is not changed, the peak value is preliminarily obtained and sampling is carried out at that position. Then, a signal corresponding to the electric charge Q is sampled.

However, as the switching element 111 for taking out electric charge from picture elements disposed in the matrix, a type in which the resistance like TFT is changed by the electric charge is sometimes used. In such a case, a relation between voltage (Vds) and current (Ids) does not become linear as shown in FIG. 7. This is a characteristic generally observed in the switching element 111 having the transistor structure.

Because of this characteristic, if the circuit shown in FIG. 5 is used, sampling at a constant timing cannot be carried out because the peak position of the output voltage Vx shown in FIG. 6A changes depending on the electric charge Q. Further, the relation between the peak value and electric charge Q becomes very complicated, so that the circuit shown in FIG. 5 cannot be used as it is.

SUMMARY OF THE INVENTION

The present invention has been achieved with such points in view, and therefore, it is an object of the invention to provide a radiation detector capable of obtaining an X-ray image having a high density resolution by always using supplied digital data valid maximum width without depending on the X-ray irradiation condition, a radiation detecting method and an X-ray diagnosing apparatus provided with the same radiation detector.

Another object of the invention is to provide an apparatus and method capable of obtaining information which cannot be obtained with a conventional I.I-TV camera, by changing a relation between an output signal and an input X-ray of an X-ray solid flat panel detector in two-dimensional region, and further supplying an observer with an easy-to-see image.

Still another object of the invention is to provide a radiation detector capable of reading out electric charge containing no noise if possible at a constant sampling timing even if the voltage and current characteristic of a switching element for taking out electric charge of each picture element is non-linear, a radiation detecting method and an X-ray diagnosing apparatus provided with the same radiation detector.

To achieve the above object, there is provided a radiation detector comprising: photoelectric converting means disposed in a matrix for converting radiation impinging through a specimen to electric charge and accumulating the electric charge; reading means for reading the electric charge accumulated in the photoelectric means; a pre-processing circuit for integrating the electric charge read out from the photoelectric means through the reading means to convert to a voltage; an A/D converter for converting an analog voltage signal output from the pre-processing circuit to a digital signal; and a control means for changing a characteristic of the pre-processing circuit depending on a radiation irradiation condition.

According to the present invention having the above structure, by changing the characteristics like the integration constant, gain of the pre-processing circuit provided before the A/D converter depending on a radiation irradiation condition, analog voltage value output by the pre-processing circuit to the A/D converter can be increased to a large enough in a range in which the A/D converter is not saturated. As a result, high precision digital radiation image information using a dynamic range of the A/D converter to the full extent thereof can be obtained.

According to a preferred embodiment of the present invention, the control means controls to change an integration constant of the pre-processing circuit.

According to another preferred embodiment of the present invention, the control means controls to change an amplification degree of the pre-processing circuit.

According to still another preferred embodiment of the present invention, the pre-processing circuit contains a plurality of amplifiers for carrying out amplifications and the control means changes the amplification degree by validating any number of amplifiers of the plurality of the amplifiers.

According to a further preferred embodiment of the present invention, the pre-processing circuit includes a low frequency component extracting circuit for extracting a low frequency component from a voltage signal obtained by integrating the electric charge read out from the photoelectric converting means and the control means sets a gain and an offset in an amplification so as to suppress the low frequency component depending on the extracted low frequency component.

According to a still further preferred embodiment of the present invention, the control means changes the characteristic of the pre-processing circuit depending on a dose of radiation impinging upon the photoelectric conversion means according to the radiation irradiation condition.

According to a yet still further preferred embodiment of the present invention, the radiation irradiation condition includes a condition of which fluoroscopy or radiography is selected.

According to a still further preferred embodiment of the present invention, the radiation irradiation condition includes a portion of the specimen exposed to radiation.

According to a still further preferred embodiment of the present invention, the control means comprises a memory means for memorizing setting information for changing the characteristic of the pre-processing circuit depending on the radiation irradiation condition.

To achieve the above object, there is provided a radiation detector comprising: a photoelectric converting means disposed in a matrix for converting radiation impinging through a specimen to electric charge and accumulating the electric charge; a bias electrode for applying a bias voltage to the photoelectric converting means; a reading means for reading the electric charge accumulated in the photoelectric converting means; a pre-processing circuit for integrating the electric charge read out from the photoelectric means through the reading means to convert to a voltage; an A/D converter for converting an analog voltage signal output from the pre-processing circuit to a digital signal; a bias voltage generating means for supplying the bias voltage to the bias electrode; and a control means for changing the bias voltage generated by the bias voltage generating means depending on a radiation condition.

According to a preferred embodiment of the present invention, a maximum/minimum detecting portion for detecting a maximum value and a minimum value of an output of the pre-processing circuit is further contained and the control means changes the bias voltage generated by the bias voltage generating means depending on the maximum value and minimum value detected by the maximum/minimum detecting portion.

To achieve the above object, there is provided a radiation detector comprising: a photoelectric converting means disposed in a matrix for converting radiation impinging through a specimen to electric charge and accumulating the electric charge; a reading means for reading the electric charge accumulated in the photoelectric converting means; an integration amplifier for integrating the electric charge read out from the photoelectric converting means through the reading means to convert to a voltage; an integration circuit for inputting and integrating an output of the integration amplifier; a sample/hold circuit for sample-holding an output of the integration circuit; and a control circuit for controlling a reading timing of the reading means.

According to the present invention, if the reading means of a switching element like TFT is turned on and electric charge accumulated in a picture element is taken out and then a predetermined time elapses, an output voltage of the integration circuit becomes a value not affected by a resistance of the switching element. Therefore, by sampling this, sampling at a constant sampling time without depending on the amount of accumulated electric charge can be carried out even if the switching element has a non-linear characteristic.

According to a preferred embodiment of the present invention, the control circuit controls the sample/hold circuit to sample-hold the output of the integration circuit after a predetermined time elapses after a timing of reading start by the reading means.

According to another preferred embodiment of the present invention, a coupling capacitor for connecting the integration amplifier to the integration circuit is further contained, and the integration circuit contains an operational amplifier; a resistor having an end connected to the coupling capacitor and the other end connected to a positive feedback input terminal of the operational amplifier; and a capacitor having an end connected to the positive feedback input terminal and the other end connected to an output terminal of the operational amplifier, and the resistor, the coupling capacitor and the capacitor have a resistance and a capacitance for reducing the frequency characteristic of a circuit comprising the coupling capacitor and the integration circuit at a high frequency side thereof.

According to this embodiment, the integration circuit reduces a high frequency noise input from the integration amplifier.

According to another preferred embodiment of the present invention, the integration circuit comprises a resistor having an end connected to the integration amplifier and the other end connected to a capacitor and the capacitor having an end connected to the resistor and the other end connected to ground, and the resistor and the capacitor have a resistance and a capacitance for reducing the frequency characteristic of a circuit comprising the integration circuit at a high frequency side thereof.

According to still another embodiment of the present invention, the integration circuit comprises a resistor, and the resistor and a capacitor forming the sample/hold circuit have a resistance and a capacitance for reducing the frequency characteristic of a circuit comprising the integration circuit and the sample/hold circuit at a high frequency side thereof.

According to a further preferred embodiment of the present invention, the resistor comprises two resistors connected in parallel and having different resistances each other.

According to a still further preferred embodiment, reset switches respectively connected to the coupling capacitor and the capacitor each in parallel for discharging electric charge accumulated in the coupling capacitor and the capacitor is further contained and the control circuit turns on/off the reset switches at timings different by a predetermined phase with timings of reading start and end by the reading means.

According to this embodiment, before the switching element is turned on, the reset switch is turned on so as to discharge accumulated electric charge. After that, the switching element is turned on in a condition that the reset switch is kept off so as to input accumulated electric charge into the charge amplifier. As a result, a voltage accurately corresponding to the accumulated electric charge can be obtained from the integration circuit.

According to a further preferred embodiment of the present invention, the resistor and the coupling capacitor are a variable resistor and a variable capacitance respectively, and the control circuit controls a timing of the sample/hold circuit to sample-hold an output of the integration circuit depending on a resistance and a capacitance of the variable resistor and the variable capacitance respectively.

According to this embodiment, for example, if the resistance value is increased, a time until the output voltage of the integration circuit becomes a stabilized value, not affected by the non-linear characteristic of the switching element is extended. Therefore, a time until the switching element is turned on so as to carry out sampling needs to be extended. However, the integration effect of the integration circuit increases so that the noise reduction effect also increases.

The nature, principle and utility of the invention will become more apparent from the following detailed description when read in conjunction with the accompanying drawings.

DESCRIPTION OF THE PREFERRED EMBODIMENTS

Hereinafter, the embodiments of the present invention will be described in detail with reference to the accompanying drawings.

Figure 8:
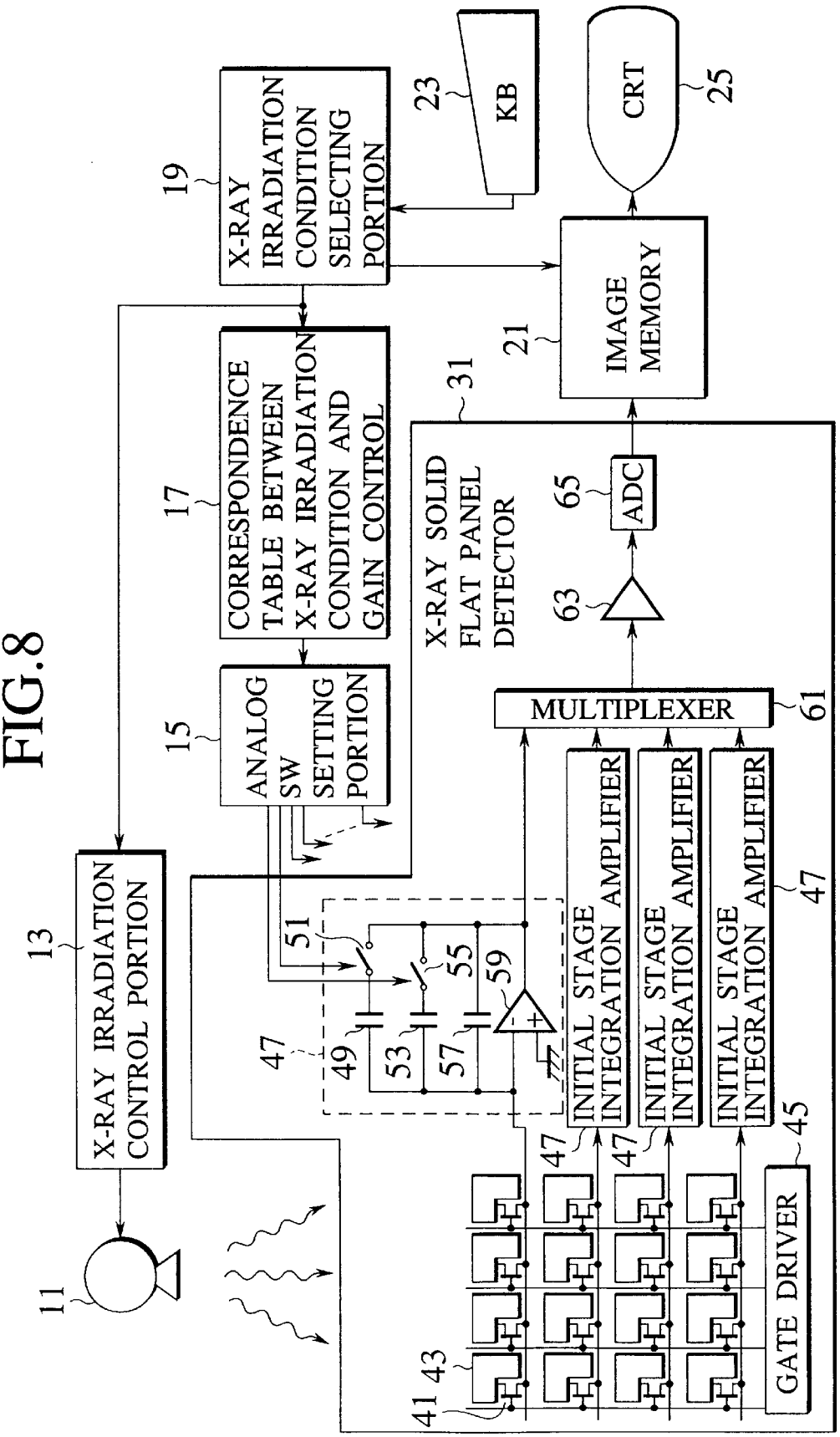
FIG. 8 is a system configuration diagram showing a structure of the X-ray imaging apparatus using a first embodiment of the X-ray solid flat panel detector of the present invention.

FIG. 8 is a block circuit diagram showing a first embodiment of an X-ray solid flat panel detector according to the present invention. According to this embodiment, A/D conversion characteristic is controlled by changing an integration capacity of an initial integration amplifier which is a pre-processing circuit depending on X-ray irradiation condition.

Referring to FIG. 8, an X-ray diagnosing apparatus 1 comprises an X-ray tube 11 which is an X-ray source, an X-ray irradiation control portion 13 for controlling the condition of X-ray irradiation from the X-ray tube 11, an analog switch (hereinafter referred to as analog SW) setting portion 15, a correspondence table 17 between X-ray irradiation condition and gain control, an X-ray irradiation condition selecting portion 19, an image memory 21 for holding X-ray image information, a keyboard (hereinafter referred to as KB) 23 for inputting X-ray irradiation condition, a CRT 25 for displaying X-ray images and an X-ray solid flat panel detector 31.

The X-ray solid flat panel detector 31 comprises a plurality of photoelectric conversion elements 43 corresponding to each of picture elements disposed, for example, in the matrix of 1000×1000, a plurality of TFTs 41 as a reading switch, disposed corresponding to each of the photoelectric conversion elements 43, a gate driver 45 for sending a drive signal to gates of the TFTs 41 of each column, a plurality of initial stage integration amplifiers 47 connected commonly to drains of the TFTs 41 of each row, a multiplexer 61 for time-division multiplexing an output of each initial stage integration amplifier 47, an amplifier 63 for amplifying an output of the multiplexer 61 and an ADC 65 for carrying out analog/digital conversion of an output of the amplifier 63 and outputting to the image memory 21.

Each of the photoelectric conversion elements 43 of the X-ray solid flat panel detector 31 may be a direct conversion type photoelectric conversion element for converting X-ray directly to electric charge or an indirect conversion type photoelectric conversion element which converts X-ray to visible light by a fluorescent material (not shown) formed on an X-ray incident plane and converts intensity distribution of this visible light to electric charge.

The initial stage integration amplifier 47 of the X-ray solid flat panel detector 31 comprises a differential amplifier 59, capacitors 49, 53, 57 and analog SWs 51, 55 like bilateral gate using complementary MOS-FET which is electronically opened or closed.

The analog SWs 51, 55 are opened or closed by a signal from the analog switch 15 so as to change the integration capacity.

Next, an operation of this first embodiment will be described. Upon X-ray radiography or fluoroscopy, first a menu screen is displayed on the CRT 25 and according to this menu, X-ray irradiation condition including tube voltage, tube current, irradiation time, imaging object, a distance up to the imaging object and the like is input to the X-ray irradiation condition selecting portion 19. The X-ray irradiation condition selecting portion 19 outputs a control signal to the X-ray irradiation control portion 13 depending on the input X-ray irradiation condition, retrieves the correspondence table 17 between the X-ray irradiation condition and gain control according to this X-ray irradiation condition and then obtains an analog SW control condition for determining an integration capacity of the initial stage integration amplifier 47 depending on this X-ray irradiation condition.

The correspondence table 17 between the X-ray irradiation condition and gain control tabulates, for example, gains corresponding to fluoroscopy/radiography information, imaging object and a distance up to the imaging object and then the analog SW opening/closing is controlled so that if the dose of incident X-ray is small, the integration capacity is small because generally, generated electric charge is small, and if the dose of incident X-ray is large, the integration capacity is large because the generated electric charge is large. This correspondence table 17 may be a fixed value written in, for example, ROM or the like, or may be rewritten depending on a change with a passage of time of the X-ray tube 11 and X-ray solid flat panel detector 31, using EEPROM etc.

Then, an analog SW setting signal for realizing this analog SW control state is produced at the analog switch setting portion 15 and then is transmitted to the analog SWs 51, 55 of each initial stage integration amplifier 47 of the X-ray solid flat panel detector 31.

Then, in this manner, a gain of the initial integration amplifier of the X-ray solid flat panel detector 31 depending on X-ray irradiation condition is set. Next, when X-ray is irradiated from the X-ray tube 11, it passes through a specimen and impinges upon each picture element of the X-ray solid flat panel detector 31. An intensity of the X-ray impinging upon each picture element is converted to electric charge by the photoelectric converting element 43 and the electric charge accumulated in each photoelectric converting element 43 is converted to a voltage by the initial stage integration amplifier 47 upon switching of the TFT 41 provided on each picture element.

Because, at this time, the initial stage integration amplifier 47 is set to an appropriate gain depending on the X-ray exposure amount, the amplitude level of the analog X-ray image signal, which is amplified by the amplifier 63 through the multiplexer 61 and then input to the ADC 65, can extract digital resolution performance of the ADC 65 to a full extent. The digital X-ray image signal obtained by the analog/digital conversion by the ADC 65 is written into the image memory 21 and displayed on the CRT 25 at a sufficient density resolution.

Because the gain of the initial stage integration amplifier 47 is set at an appropriate gain depending on the X-ray irradiation condition according to this embodiment, a signal to be input to the ADC 65 is capable of effectively using dynamic range of the ADC 65, intensifying X-ray image density resolution capacity and reading a minute change of contrast. This embodiment is the best mode in viewpoints of integration as compared to embodiments which will be described later.

Although according to this embodiment, three kinds of capacitors 49, 53, 57 in terms of integration capacity are provided so that they are changeable by two analog SWs 51, 55, the present invention is not restricted to this method, but it is permissible to provide the capacitor 57 also with an analog SW and further, it is possible to provide an arbitrary number of integration capacities and analog SWs for changing them.

As a modification of this embodiment, it is permissible to provide a control means for monitoring an output of the pre-processing circuit before the ADC 65 such as an output of the initial stage integration amplifier 47, an output of the multiplexer 61 and an output of the amplifier 63 and controlling the analog SW setting portion 15 according to a result of this monitoring. And, when these output voltages exceed each predetermined value, it is permissible to change the integration constant and gain of the initial stage integration amplifier 47 to so control that the output voltage of the pre-processing circuit is reduced.

Figure 9:
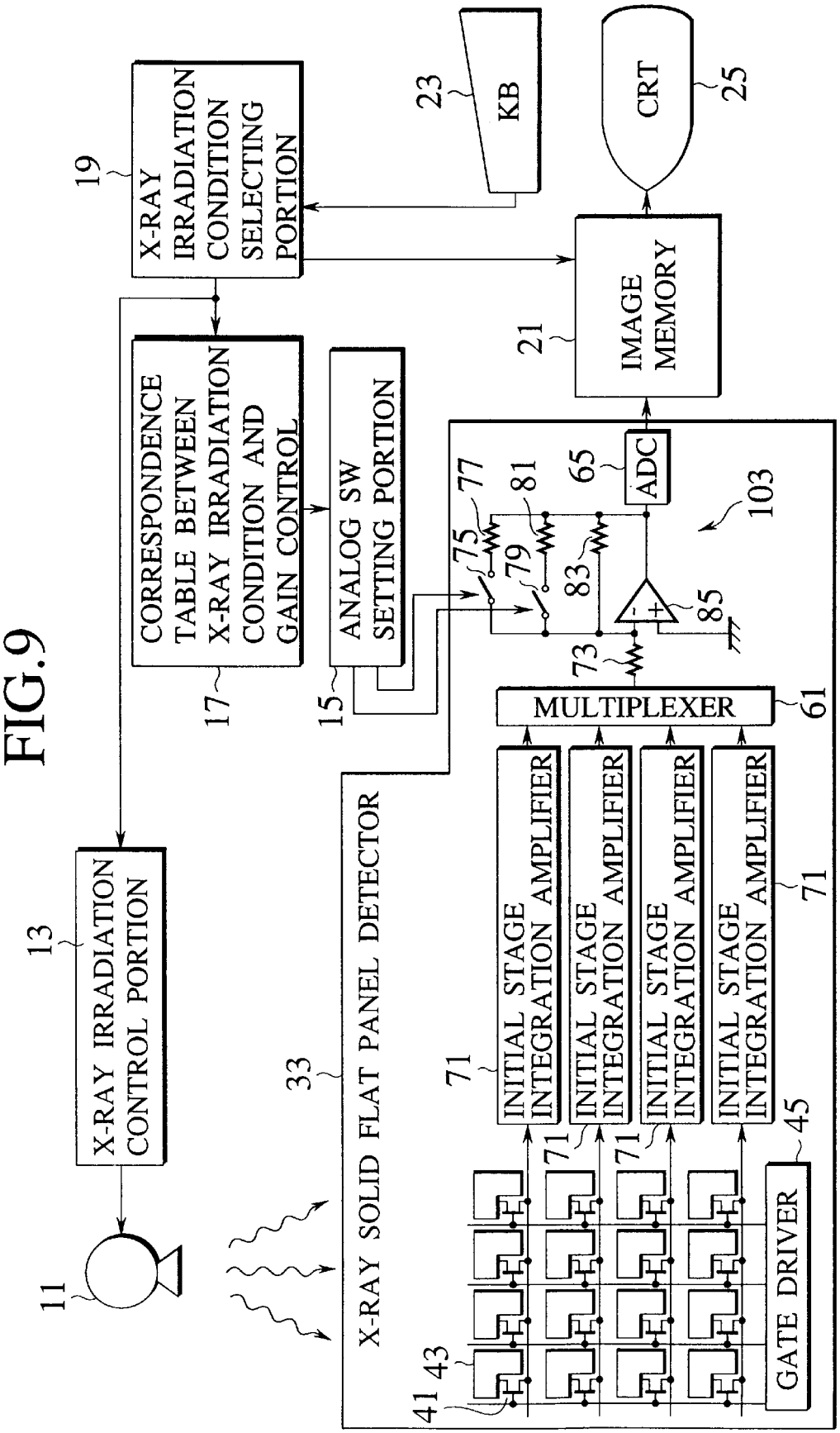
FIG. 9 is a system configuration diagram showing a structure of the X-ray imaging apparatus using a second embodiment of the X-ray solid flat panel detector of the present invention.

FIG. 9 is a block circuit diagram for explaining a second embodiment of an X-ray solid flat panel detector according to the present invention. This embodiment indicates an example in which the A/D conversion characteristic is controlled by changing a gain of an amplifier which is a pre-processing circuit of the A/D converter depending on the X-ray irradiation condition.

Referring to FIG. 9, the X-ray diagnosing apparatus 3 comprises a X-ray tube 11, X-ray irradiation control portion 13, analog SW setting portion 15, correspondence table 17 between the X-ray irradiation condition and gain control, X-ray irradiation condition selecting portion 19, image memory 21, KB 23, CRT 25, and X-ray solid flat panel detector 33.

The X-ray diagnosing apparatus 3 of this embodiment is the same as the first embodiment excluding that the X-ray solid flat panel detector 33 is utilized instead of the X-ray solid flat panel detector 31. Therefore, a description thereof is omitted.

The X-ray solid flat panel detector 33 comprises a plurality of photoelectric converting elements 43 disposed in the matrix of 1000×1000, a plurality of TFTs 41 as a reading switch provided corresponding to each of the photoelectric converting elements 43, a gate driver 45 for sending a drive signal to gates of the TFTs 41 of each column, a plurality of initial stage integration amplifiers 71 commonly connected to drains of the TFTs 41 of each row, a multiplexer 61 for time-division multiplexing an output of each initial stage integration amplifier 47, an amplifier 103 for amplifying an output of the multiplexer 61 and an ADC 65 for carrying out analog/digital conversion of an output of the amplifier 103 and outputting to the image memory 21.

As for the components of the X-ray solid flat panel detector 33, the plurality of the photoelectric converting elements 43, TFTs 41 provided corresponding to each of the photoelectric converting elements 43, the gate driver 45, the multiplexer 61 and ADC 65 are the same as the components of the X-ray solid flat panel detector 31 of the first embodiment. Therefore, a description thereof is omitted.

The X-ray solid flat panel detector 33 of this embodiment is different from the first embodiment in that an initial stage integration amplifier having a fixed integration capacity is provided and an amplification degree variable amplifier 103 is provided between the multiplexer 61 for time-division multiplexing an output of each initial stage integration amplifier 71 and ADC 65.

In the amplifier 103, its amplification degree (Rf/Ri) is determined by a value Ri of a resistor 73 provided on an input side of the amplifier and a feedback resistance Rf fed back from an output of an operational amplifier 85 to its negative input. Therefore, resistors 77, 81 returning from an output of the operational amplifier 85 to its negative input are respectively provided with analog SWs 75, 79 in series and the respective SWs 75, 79 are changed by a signal from the analog SW setting portion 15. Because the feedback resistance changes as a result, the amplification degree of the amplifier 103 can be changed.

Like the analog SW used for the first embodiment, it is possible to use bilateral gate using, for example, complementary MOS-FET which is electronically opened or closed or other element.

Next, an operation of this second embodiment will be described. Upon X-ray radiography or fluoroscopy, first a menu screen is displayed on the CRT 25. According to this menu, X-ray irradiation condition including a tube voltage, tube current, exposure time, imaging object and a distance up to the imaging object is input to the X-ray irradiation condition selecting portion 19. The X-ray irradiation condition selecting portion 19 outputs a control signal depending on the input X-ray irradiation condition to the X-ray irradiation control portion 13. According to this X-ray irradiation condition, the correspondence table 17 between the X-ray irradiation condition and gain control is retrieved and an analog SW control condition for determining a gain of the amplifier 103 corresponding to this X-ray irradiation condition is obtained.

The correspondence table 17 between the X-ray irradiation condition and gain control tabulates, for example, gains corresponding to fluoroscopy/radiography information, imaging object and a distance up to the imaging object. Generally, the analog SW opening/closing is so controlled that when the dose of incident X-ray is small, the feedback resistance Rf is increased to increase the gain of the amplifier 103 because generated electric charge is small, and when the dose of incident X-ray is large, the feedback resistance Rf is decreased to decrease the gain because generated electric charge is large. This correspondence table 17 may contains fixed values preliminarily written to, for example, ROM or the like or may be rewritten depending on a change with passage of time of the X-ray tube 11 or X-ray solid flat panel detector 33, using EEPROM etc.

Then, an analog SW setting signal for realizing the analog SW control state is produced and sent to the analog SWs 75, 79 of the amplifier 103 of the X-ray solid flat panel detector 33.

As a result, the gain of the amplifier 103 of the X-ray solid flat panel detector 33 is set corresponding to the X-ray irradiation condition and when the X-ray is irradiated, a gain optimum for that exposure amount is obtained, so that the dynamic range of the ADC 65 can be utilized effectively, X-ray image density resolution capacity is increased and a change of minute contrast can be read.

Although, according to this embodiment, three feedback resistors 77, 81, 83 are provided in the amplifier 103, the present invention is not restricted to this number but it is possible to change over an arbitrary number of the feedback resistors.

Further, even if the amplifier 103 of this embodiment is provided before the multiplexer 61, the same operation and effect can be obtained.

Figure 10A:
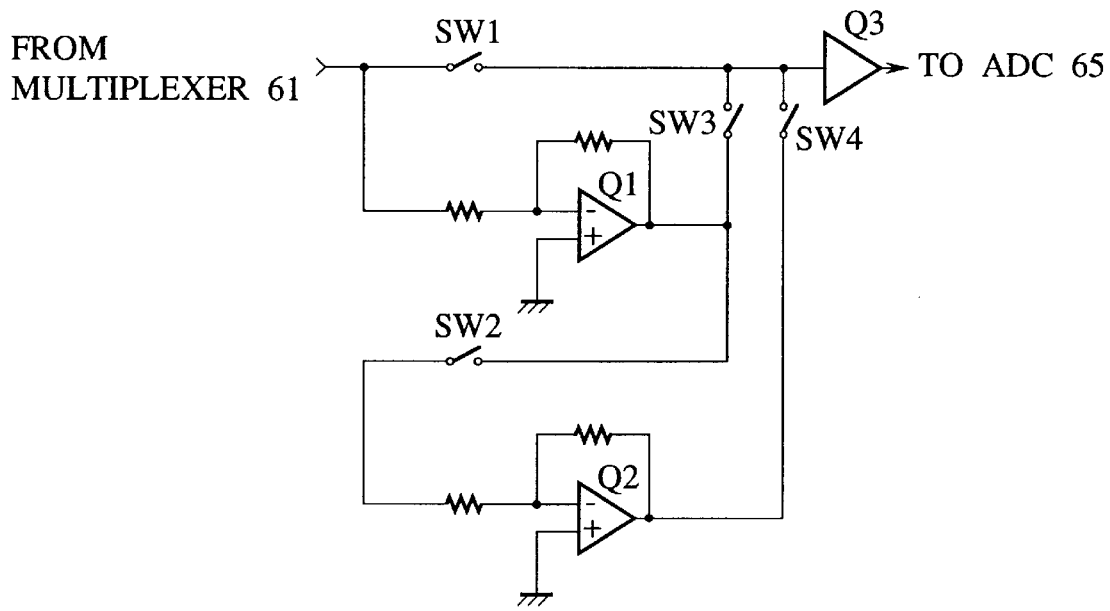
FIGS. 10A, 10B are partial circuit diagrams showing a modification of the second embodiment.
Figure 10B:
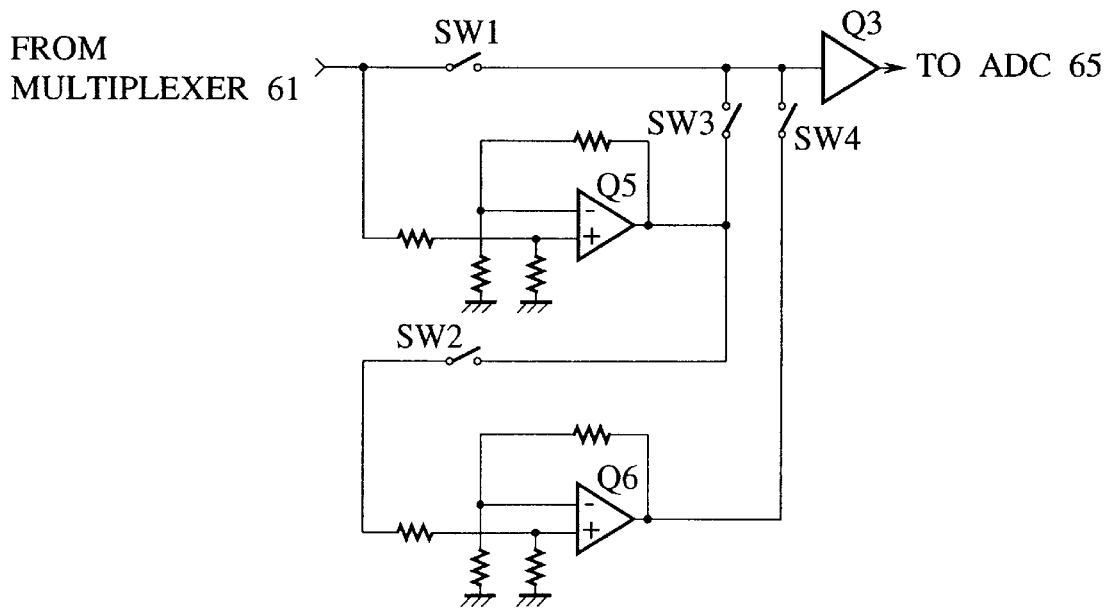

As a modification of a second embodiment, instead of changing the gain of the post stage amplifier 85, it is permissible to provide plural post stage amplifiers Q1, Q2 or Q5, Q6 connected in series as shown in FIGS. 10A, 10B and change over the step thereof. Particularly, it is also permissible to provide a plurality of amplifiers having different gains and change over the amplifiers although not shown. In any case, there is no restriction on the number of steps or quantity of the amplifiers to be changed over and any number of the amplifiers may be changed over as required.

Further, as a modification of this embodiment, it is permissible to provide a control means for monitoring an output of the pre-processing circuit before the ADC 65, such as an output of the initial stage integration amplifier 71, an output of the multiplexer 61 and an output of the amplifier 85 and then controlling the analog SW setting portion 15 according to a result of this monitoring. Then, when these output voltages become lower than a predetermined value, it is permissible to so control to reduce the output voltage of the pre-processing circuit by changing the gain of the amplifier 103.

Figure 11:
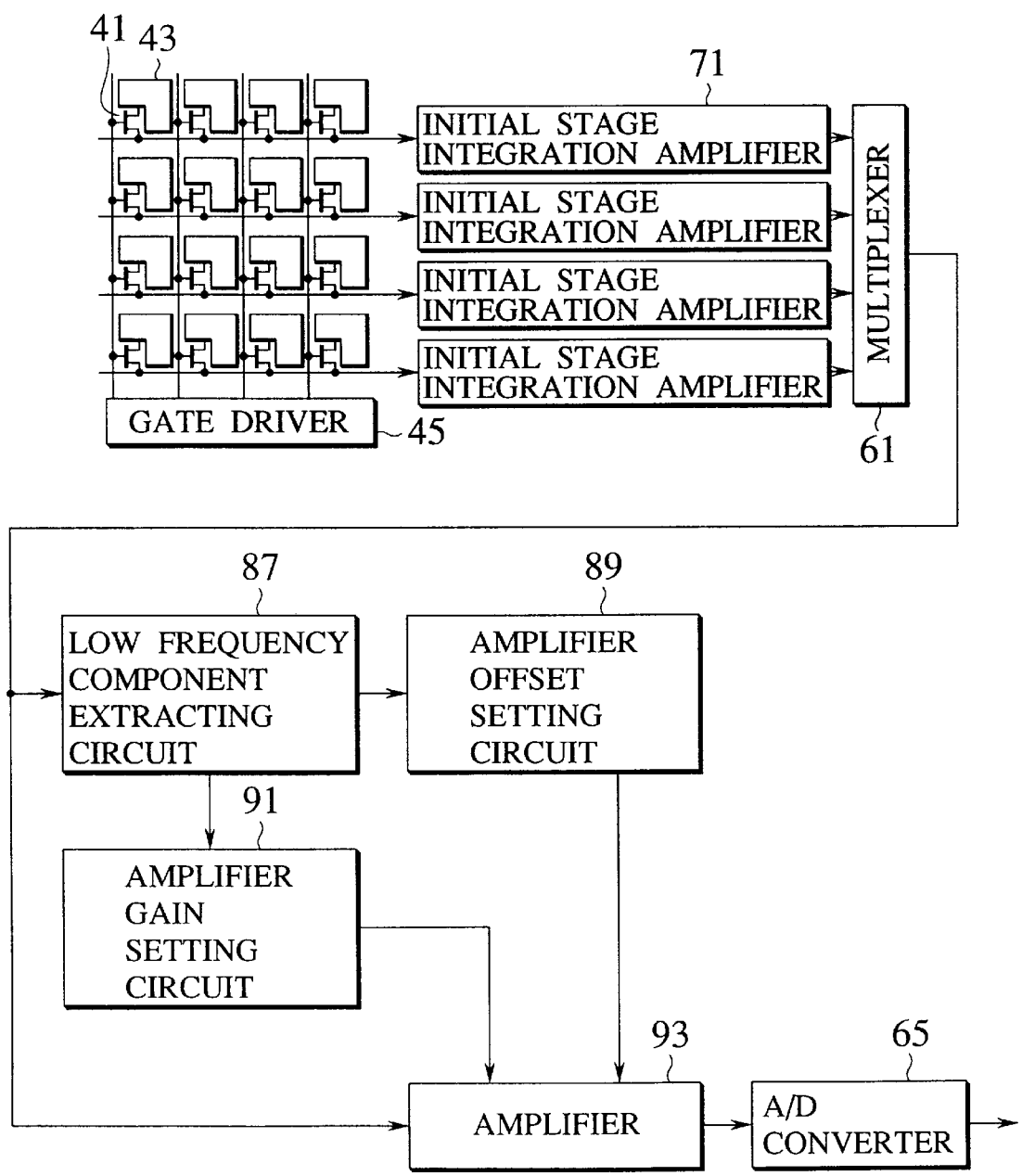
FIG. 11 is a block diagram showing a third embodiment of the X-ray solid flat panel detector of the present invention.

FIG. 11 is a block circuit diagram for explaining a third embodiment of the X-ray solid flat panel detector according to the present invention. According to this embodiment, by changing the gain of the amplifier with respect to a two-dimensional region of a read signal of the X-ray solid flat panel detector 35, the A/D conversion characteristic is controlled.

Referring to FIG. 11, the X-ray solid flat panel detector 35 comprises a plurality of photoelectric converting elements 43 disposed in the matrix of, for example, 1000×1000 corresponding to each picture element, a plurality of TFTs 41 as a reading switch provided corresponding to each of the photoelectric converting elements 43, a gate driver 45 for sending a drive signal to gates of TFTs 41 of each column, a plurality of initial stage integration amplifiers 71 commonly connected to drains of the TFTs 41 of each row, a multiplexer 61 for time-division multiplexing an output of each initial stage integration amplifier 71, an amplifier 93 for amplifying an output of the multiplexer 61, an ADC 65 for carrying out analog/digital conversion of an output of the amplifier 93 and outputting to the image memory 21, a low frequency extracting circuit 87 for extracting a low frequency component from an output of the multiplexer 61, an amplifier offset setting circuit 89 and amplifier gain setting circuit 91 for setting offset and gain of the amplifier 93, respectively, depending on a result of extraction by the low frequency extracting circuit 87.

Each of the photoelectric converting elements 43 of the X-ray solid flat panel detector 35 may be direct conversion type photoelectric converting element for converting the X-ray directly to electric charges or indirect conversion type photoelectric converting element for converting the X-ray to visible light by a fluorescent material (not shown) formed on the X-ray incident plane and converting intensity distribution of this visible light to electric charges.

Next, an operation of the third embodiment will be described. Like the conventional X-ray solid flat panel detector, X-ray or light produced by conversion of the X-ray impinges upon each picture element of the X-ray solid flat panel detector 35, and electric charge corresponding to the dose of impinging X-ray or light is produced, so that an analog X-ray image signal is obtained as an output signal of the multiplexer 61. The X-ray image signal obtained as the output of the multiplexer 61 is input to the amplifier 93 and its low frequency component is extracted by the low frequency component extracting circuit 87. The extracted low frequency component information is input to the amplifier offset setting circuit 89 and amplifier gain setting circuit 91 and converted to amplifier offset signal and amplifier gain control signal respectively in which the low frequency component is suppressed and high frequency component is stressed, and then supplied to the amplifier 93. The amplifier 93 amplifies the analog X-ray image signal according to the amplifier offset and amplifier gain and outputs to the ADC 65.

Figure 12D:
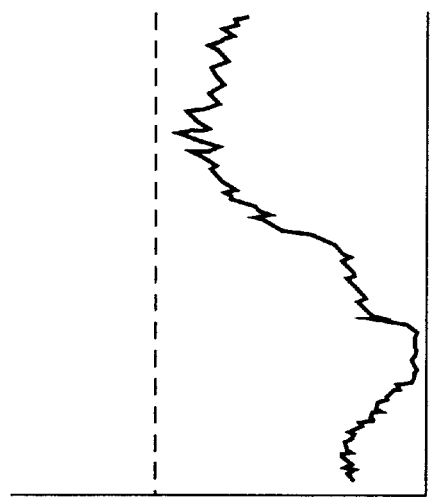
FIGS. 12A–12D are diagrams for showing an operation of the third embodiment.
Figure 12A:
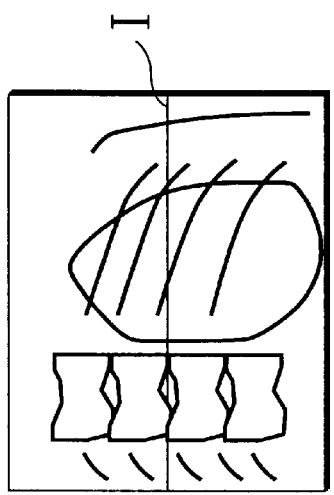
Figure 12C:
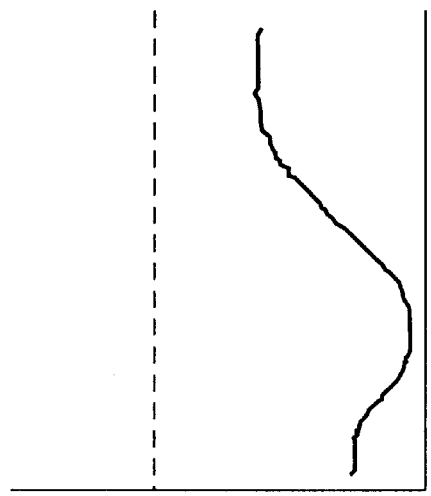
Figure 12B:
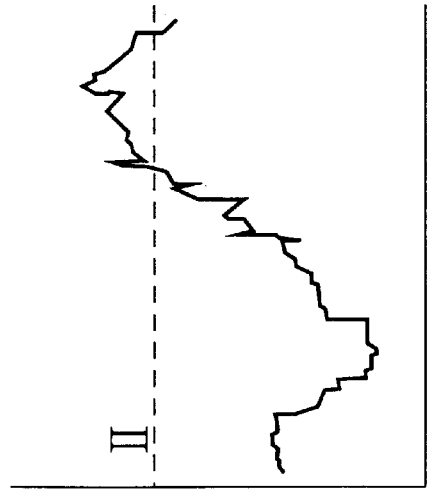

FIGS. 12A–12D are diagrams for explaining an operation of the third embodiment. FIG. 12A shows an image of the X-ray obtained by matrix of the photoelectric converting element 43. A profile of I line of FIG. 12A is output as shown in FIG. 12B if the present invention is not used, so that information input beyond an input upper limit of the A/D converter shown by II line is not quantitized but lost. Then, a low frequency component shown in FIG. 12C is extracted and the low frequency component is suppressed using this and then a high frequency component is stressed. Consequently, a profile as shown in FIG. 12D is obtained.

Next, a fourth embodiment of the X-ray solid flat panel detector according to the present invention will be described.

Figure 13:
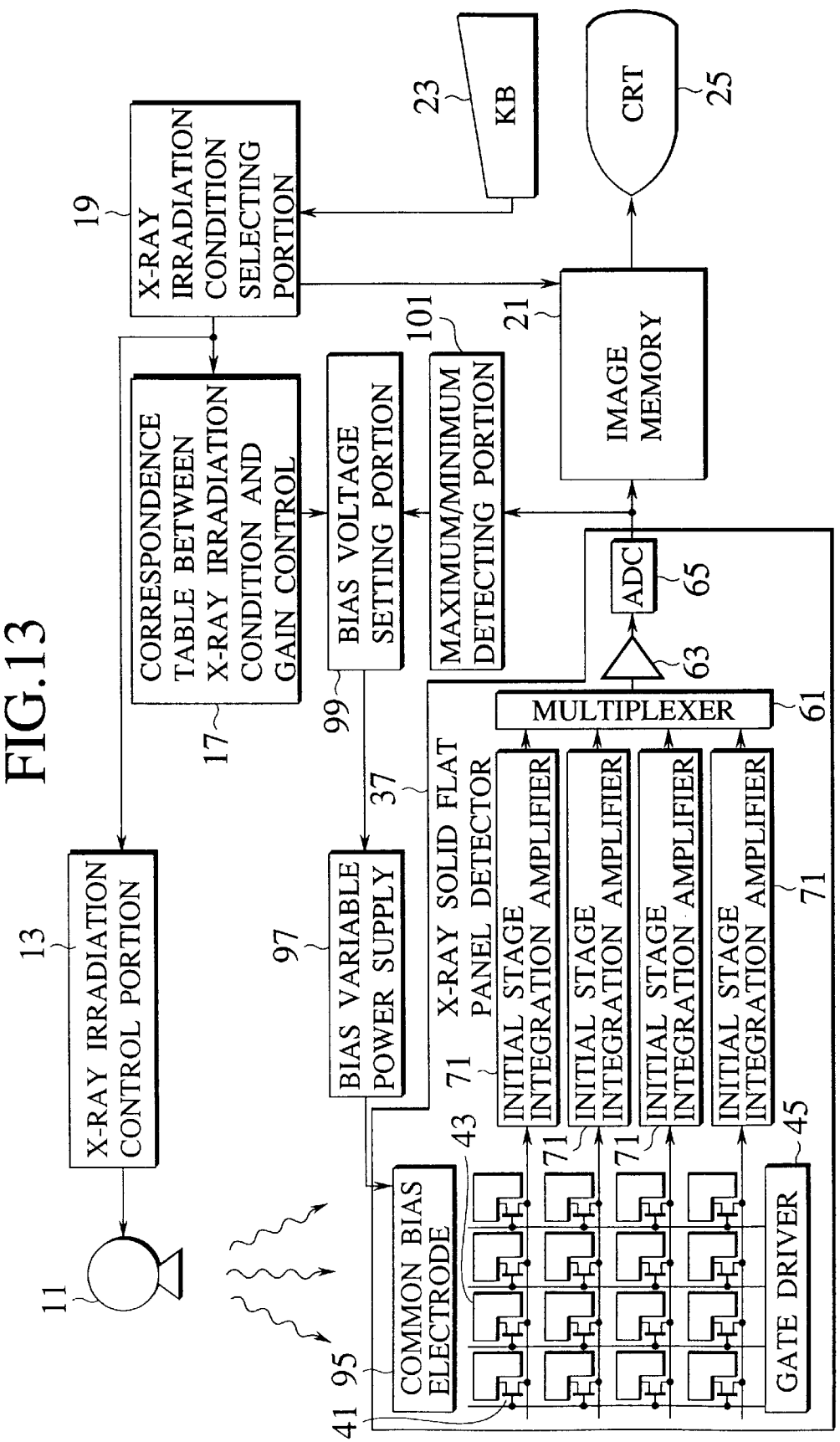
FIG. 13 is a system configuration diagram showing a structure of the X-ray imaging apparatus using a fourth embodiment of the X-ray solid flat panel detector of the present invention.

FIG. 13 is a block circuit diagram for explaining a fourth embodiment of the X-ray solid flat panel detector according to the present invention. According to this embodiment, by changing bias voltage of a photoelectric conversion film for converting the X-ray to electric charge depending on the X-ray irradiation condition, the A/D conversion characteristic is controlled.

Referring to FIG. 13, the X-ray diagnosing apparatus 5 comprises an X-ray tube 11 which is an X-ray source, X-ray exposure control portion 13 for controlling the X-ray irradiation condition from the X-ray tube 11, correspondence table 17 between the X-ray irradiation condition and gain control, X-ray irradiation condition selecting portion 19, image memory 21 for holding the X-ray image information, KB 23 for inputting the X-ray irradiation condition, CRT 25 for displaying the X-ray image, X-ray solid flat panel detector 37, bias variable power supply 97 for supplying bias voltage to the X-ray solid flat panel detector 37, bias voltage setting portion 99 and maximum/minimum detecting portion 101.

The X-ray solid flat panel detector 37 comprises a plurality of photoelectric converting elements disposed in the matrix of, for example, 1000×1000 corresponding to each picture element, a plurality of TFTs 41 as a reading switch disposed corresponding to each of the photoelectric converting elements 43, a gate driver 45 for sending a drive signal to gates of the TFTs of each column, a plurality of initial stage integration amplifiers 71 commonly connected to drains of the TFTs 41 of each row, a multiplexer 61 for time division multiplexing an output of each initial stage integration amplifier 71, an amplifier 63 for amplifying an output of the multiplexer 61 and an ADC 65 for carrying out analog/digital conversion of an output of the amplifier 63 and outputting to the image memory 21.

The plural photoelectric converting elements 43 are of direct conversion type using, for example, amorphous-selenium film (hereinafter referred to as a-Se) and the X-ray solid flat panel detector 37 further comprises a common bias electrode 95 for applying a common bias voltage upon the plurality of the photoelectric converting elements 43.

Next, an operation of the fourth embodiment will be described. Upon X-ray radiography or fluoroscopy, first a menu screen is displayed on the CRT 25 and according to this menu, the X-ray irradiation condition such as a tube voltage, tube current, exposure time, imaging object, a distance up to the imaging object and the like is input to the X-ray irradiation condition selecting portion 19. The X-ray irradiation condition selecting portion 19 outputs a control signal to the X-ray exposure control portion 13 corresponding to the X-ray irradiation condition, and according to this X-ray irradiation condition, the correspondence table 17 between the X-ray irradiation condition and gain control is retrieved so as to obtain a bias voltage corresponding to this X-ray irradiation condition.

The correspondence table 17 between the X-ray irradiation condition and gain control tabulates, for example, gains corresponding to fluoroscopy/radiography information, imaging object, and a distance up to the imaging object. Generally, if the dose of incident X-ray is small, the bias voltage is increased so as to increase generated electric charge, and if the dose of incident X-ray is large, the bias voltage is reduced so as to reduce the generated electric charge. This correspondence table 17 may be a fixed value written in, for example, ROM or the like, or may be rewritten depending on a change with a passage of time of the X-ray tube 11 and X-ray solid flat panel detector 37, using EEPROM etc.

As a result of the retrieval by the correspondence table 17 between the X-ray irradiation condition and gain control, an obtained bias voltage condition is sent to a bias setting portion 99 and the bias variable power supply 97 is controlled so as to generate a bias voltage depending on bias voltage condition in the bias setting portion 99. Then, a bias voltage depending on the X-ray irradiation condition is supplied to the X-ray solid flat panel detector 37.

Next, when the X-ray is irradiated from the X-ray tube 11, it passes through a specimen (not shown) and each picture element of the X-ray solid flat panel detector 37. An intensity of the X-ray impinging upon each picture element is converted to electric charge by the photoelectric converting element 43 and the electric charge accumulated in each photoelectric converting element 43 is converted to a voltage by the initial stage integration amplifier 71 upon switching of the TFT 41 provided on each picture element.

This voltage is amplified by the amplifier 63 through the multiplexer 61 and then input to the ADC 65. The amplitude level of this analog X-ray image signal to be input to the ADC 65 can extract digital resolution capacity of the ADC 65 to a full extent. The digital X-ray image signal obtained by the analog/digital conversion by the ADC 65 is written into the image memory 21 and displayed on the CRT 25 at a sufficient density resolution.

According to this embodiment, depending on the X-ray irradiation condition, and physical constitution and position of a specimen, sometimes the bias voltage does not become optimum if only the X-ray irradiation condition is provided. In this case, for a second X-ray exposure, the bias voltage can be changed by using the analog/digital conversion result which is a result of the first X-ray exposure.

Therefore, a maximum/minimum detector 101 for monitoring an output of the ADC 65 is provided. The maximum/minimum detector 101 detects a maximum value and a minimum value from the digital X-ray image data converted by the ADC 65 and determines whether or not generated electric charge of the photoelectric converting element 43 is saturated for each picture element.

Figure 14A:
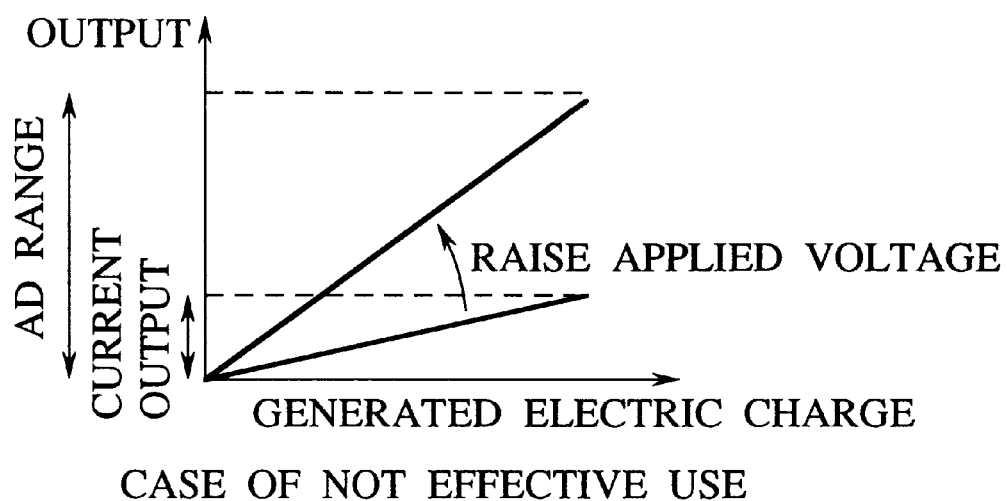
FIGS. 14A, 14B are diagrams for showing an operation of the fourth embodiment.
Figure 14B:
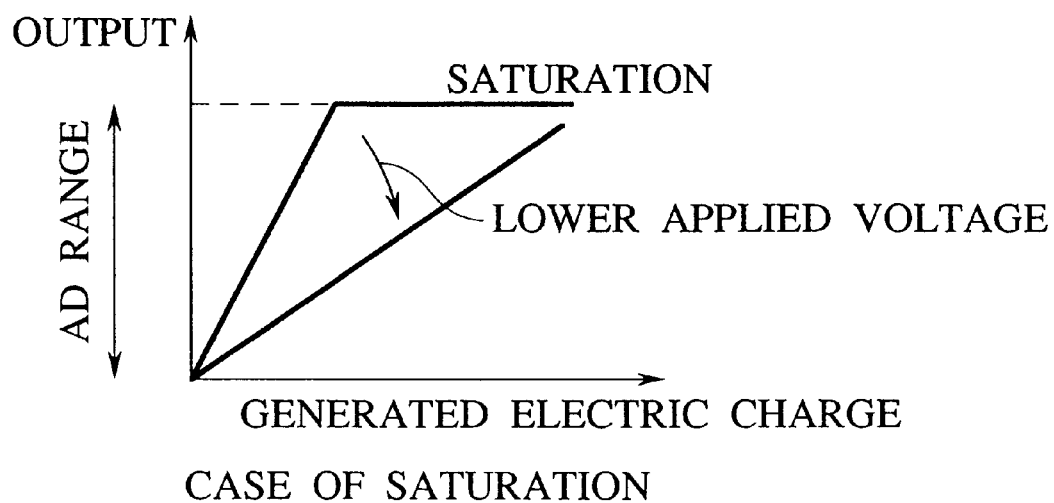

If, as a result of this determination, as shown in FIG. 14A, generated electric charges of any picture element is not saturated and a current X-ray image output level is sufficiently smaller than the ADC range, a signal is sent to the bias setting portion 99 to increase the bias voltage at next time. On the other hand, if a picture element range in which generated electric charge is saturated is larger than a predetermined size as shown in FIG. 14B, a signal is sent to the bias setting portion 99 to reduce the bias voltage at next time.

As a result, the bias voltage of the X-ray solid flat panel detector 37 is set to an appropriate gain depending on the X-ray irradiation condition. Therefore, it comes that a signal input to the ADC 65 is capable of effectively using a dynamic range of the ADC 65, intensifying density resolution on the X-ray image and reading a minute change of contrast.

According to this embodiment, even if the bias voltage is difficult to set by the X-ray irradiation condition, an optimum bias voltage for the X-ray solid flat panel detector can be obtained in a second or following X-ray radiography or a second or following X-ray fluoroscopy.

Further, although according to this embodiment, it is detected that generated electric charge of the photoelectric converting element is saturated according to an output of the A/D converter, it is permissible to have such a structure for directly detecting that phenomenon using a comparator or the like from an analog voltage input to the A/D converter.

According to the above described embodiment, digital gradation after A/D conversion can be utilized to a full extent upon X-ray fluoroscopy, density resolution for the X-ray image can be increased, and a minute change of contrast can be read so that the diagnosing performance can be intensified.

Further, according to the above described embodiment, in X-ray fluoroscopy on a portion in which X-ray low absorption region and high absorption region coexist, accompanied by panning of a specimen like cardiovascular inspection, easy-to-see pictures without halation can be obtained without use of a mechanical filter.

Next, an embodiment for removing noise will be described.

Figure 15:
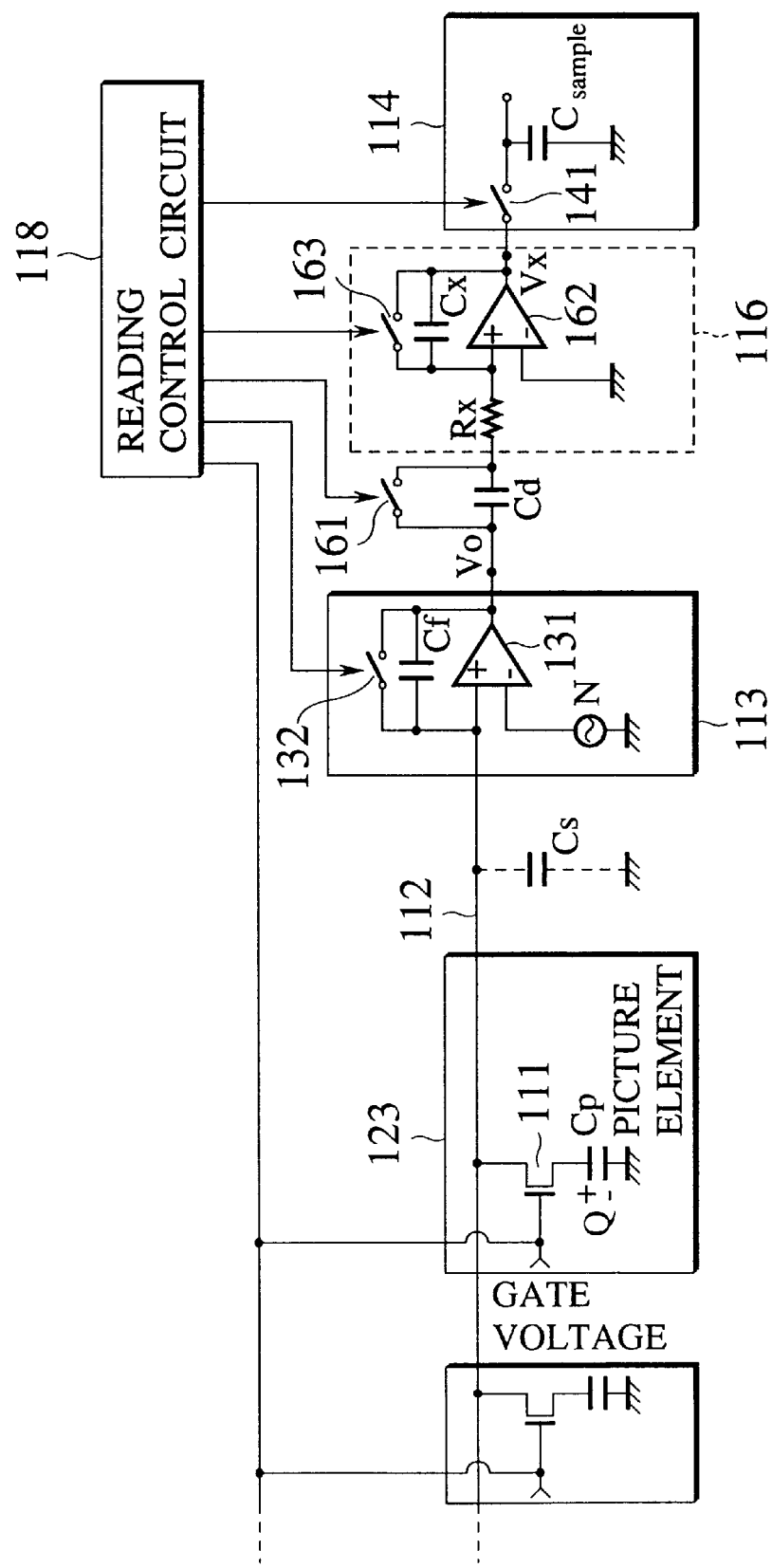
FIG. 15 is a block diagram for showing a fifth embodiment of the X-ray solid flat panel detector of the present invention.

FIG. 15 is a block diagram showing a fifth embodiment of an X-ray solid flat panel detector of the present invention.

In this example, a line is extracted from a picture element circuit 123 disposed in the matrix of N lines×M columns. If the X-ray is irradiated, a capacitance component Cp (hereinafter referred to as Cp) of a picture element accumulates electric charge Q and this electric charge Q is read out on a signal line 112 through such a switching element 111 as the TFT. An integration amplifier 113 integrates the electric charge Q read out on the signal line 112 and generates a voltage Vo corresponding to this integration value. This voltage Vo is input to the integration circuit 116 through a coupling capacitor Cd and integrated here so as to produce a voltage Vx. This is held by a sample/hold circuit 114. At this time, a reading control circuit 118 controls ON/OFF of the switching element 111, reset of the integration amplifier 113 and integration circuit 116 and a sample timing of a sample holding circuit 114 so as to read out and control the electric charge Q.

The integration amplifier 113 comprises an operation amplifier 131, a capacitor Cf and a reset switch 132. The integration circuit 116 comprises a resistor Rx, an operation amplifier 162, a capacitor Cx and a reset switch 163. A sample/hold circuit 114 comprises a sampling switch 141 and a capacitor $C_{sample}$ for holding electric charges. A reset switch 161 is connected to the coupling capacitor Cd in parallel thereto.

Next, an operation of this embodiment will be described. As the photoelectric element forming the aforementioned picture element Cp, a photoconductor such as amorphous Se or the like is used. If the X-ray strikes it, an amount of positive holes and electron corresponding to an intensity thereof are generated. Because electric field is applied to this photo conductor, electrons are attracted to the electrode of a higher potential and positive holes are attracted to a picture element electrode of a lower potential. Electric charge caused by dielectric effect is expressed by Q accumulated in an equivalent circuit Cp of a picture element shown in FIG. 15. The capacitance component accumulating this Q is expressed by Cp as described above. In actual configuration, the above photo conductor forms the capacitance component or an auxiliary capacitance component forms a capacitance component Cp provided between the aforementioned picture element electrode and ground potential.

The reading control circuit 118 turns off the switching element 111. In this while, X-ray is irradiated. As a result, electric charge Q is accumulated in the picture element Cp. After that, the reading control circuit 118 turns off the reset switches 132, 161, 163 and then turns on the switching element 111 so as to transmit electric charge Q to the signal line 112. Consequently, the integration amplifier 113 outputs a voltage of Vo=Q/Cf. The opening/closing timings of the reset switches 132, 161, 163 are controlled by the reading control circuit 118 at the same timing.

The Vo is integrated by the integration circuit 116 so as to produce a voltage Vx. This voltage Vx is input to the sample/hold circuit 114. The reading control circuit 118 turns on the sampling switch 141 at an appropriate timing so as to hold the voltage Vx in the capacitor $C_{sample}$, then turns off the sampling switch 141, and further turns on the reset switches 132, 161, 163, discharging electric charge accumulated in the respective circuits to reset the respective circuits.

Figure 16:
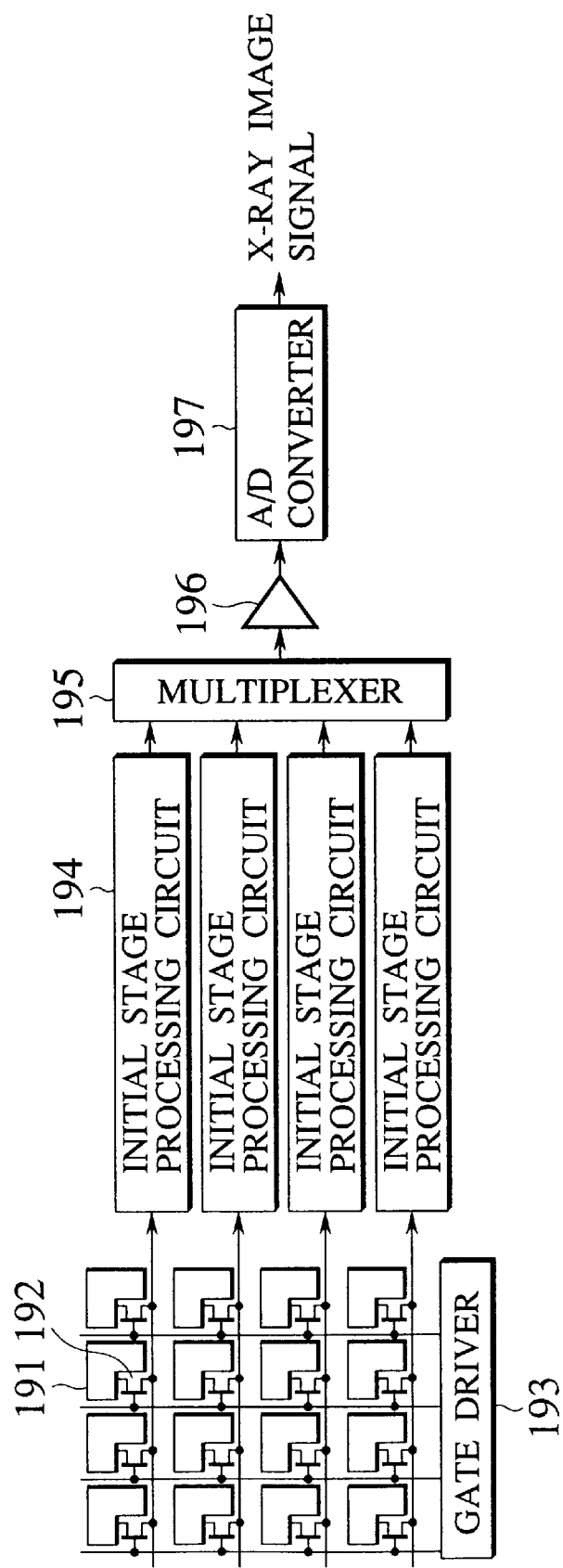
FIG. 16 is a block diagram showing an entire structure of the X-ray solid flat panel detector shown in FIG. 15.

FIG. 16 is a block diagram showing an entire structure of the X-ray detector of this embodiment including a circuit of FIG. 15. Photoelectric converting elements 191 equivalent to the picture element of FIG. 15 are disposed in the matrix of, for example, 1000×1000 to form picture elements. This X-ray detector comprises a plurality of TFTs 192 as a switching element 111 for reading provided corresponding to each of the photoelectric converting elements 191, a gate driver 193 for sending a drive signal to gates of the TFTs of each column, an integration amplifier 113 having a circuit shown in FIG. 15 commonly connected to drains of the TFTs 192 of each row, initial stage processing circuits 194 equivalent to the integration circuit 116 and sample/hold circuit 114, a multiplexer 195 for time-division multiplexing an output of each initial stage processing circuit 194, an amplifier 196 for amplifying an output of the multiplexer 195 and an A/D converter 197 for carrying out analog/digital conversion of an output of the amplifier 196 and outputting an X-ray image signal.

Therefore, a voltage temporarily held by the sample/hold circuit 114 is input to the analog multiplexer 195 together with other line outputs and a line output is successively selected by the multiplexer 195 and output as a one-dimensional electric signal. After that, this signal is digitized by the A/D converter 197 and stored at an address corresponding to a position of the two-dimensional photoelectric converting element 191 on the two-dimensional memory (not shown).

Figure 17:
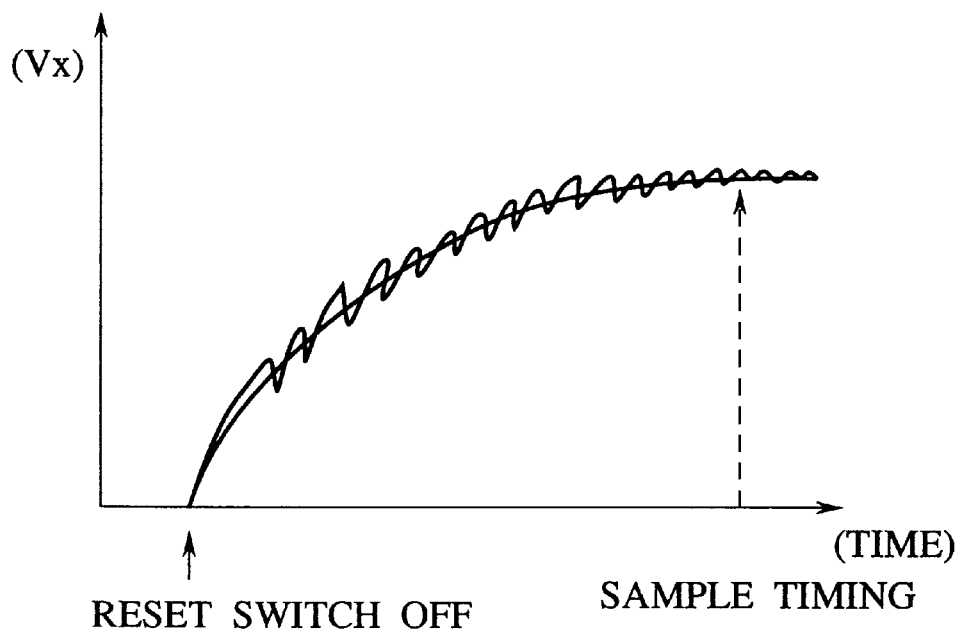
FIG. 17 is a characteristic diagram showing a waveform of the voltage Vx shown in FIG. 15 with a passage of time.

The switching element 111 forming the picture element circuit 123 is composed of semiconductor elements like the TFTs 192 as shown in FIG. 16 and generally, this semiconductor element has non-linear voltage-current characteristic as shown in FIG. 17. That is, although the voltage Vds which is Q/Cp is applied to the switching element 111 by the electric charge Q, an actually flowing current is not brought into a linear relation as shown here relative to this Vds, and even if the Vds is increased, the current is not proportional therewith.

Namely, if the Vds is large, there occurs an phenomenon that a resistance value of the switching element 111 apparently becomes large. This phenomenon is determined by semiconductors forming the switching element 111 and this phenomenon is likely to occur in such an element having a transistor structure as the TFT.

Figure 7:
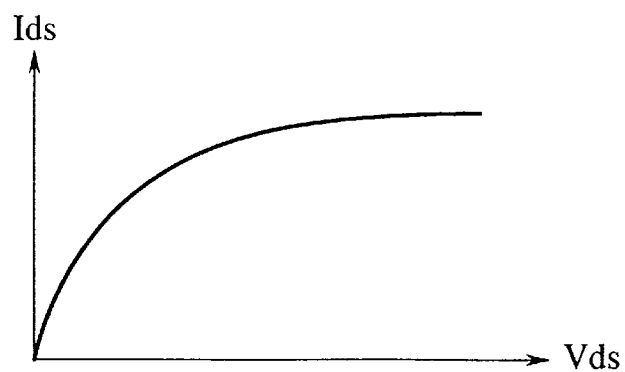
FIG. 7 is a characteristic diagram showing a voltage-current relation of the switching element shown in FIG. 5.

When the switching element (TFT) 111 is on such that the electric charge Q is flowing through the signal line 112, the reset switches 132, 161, 163 are controlled so as to be off, and consequently a following voltage occurs in Vo. Here, Rt indicates a resistance value when the switching element 111 is on and N indicates a noise source as shown in FIG. 7.

In this case, the output Vo of the integration amplifier 113 is expressed in a following formula (3).

$$Vo=(-Q/Cf)[1-\exp(-t/(Cp \cdot Rt))]+(1+Cs/Cf)N \quad (3)$$

If, according to the above formula, sampling is carried out after a sufficient time elapses, a voltage expressed in a following formula (4) can be observed.

$$V0=(-Q/Cf)+(1+Cs/Cf)N \quad (4)$$

Therefore, it is indicated that even if Rt has the characteristic of FIG. 7, a voltage proportional to the signal charge Q can be obtained. However, it is indicated that as the stray capacitance Cs of the signal line 112 increases, the noise source N more baldly affects observation of the signal.

A purpose of the structure of this embodiment is to reduce noise without being affected by Rt. Although the aforementioned Vo is further integrated by the integration circuit 116 so that it becomes a voltage Vx, the voltage Vx becomes as shown by a following formula (5) with a passage of time.

$$Vx=Q(Cd/(Cf \cdot Cx))[1+\alpha \cdot Cp \cdot Rt-\exp(-t/(Cp \cdot Rt))-\alpha \cdot Cd \cdot Rx-\exp(-t/(Cd \cdot Rx))]+Nx \quad (5)$$

where $\alpha=Cd \cdot Rx-Cp \cdot Rt$ and noise is indicated by Nx.

According to the formula (5), if a time after the switching element 111 is turned on until the sampling is carried out is large enough with respect to time constant of Cd·Rx, the output Vx of the integration circuit 116 is expressed by a following formula (6).

$$Vx=Q[Cd/(Cf \cdot Cx)]+Nx \quad (6)$$

Therefore, the voltage Vx can be obtained as a stabilized output not depending on Rt.

On the other hand, the noise component Nx superimposed on the signal component of Vx can be estimated and analyzed from a transfer function F(s) of the integration circuit 116. F(s) is expressed by the formula (7).

$$F(s)=(1/Cx \cdot Rx)[1/(s+(1/Cd \cdot Rx))] \quad (7)$$

Figure 18:
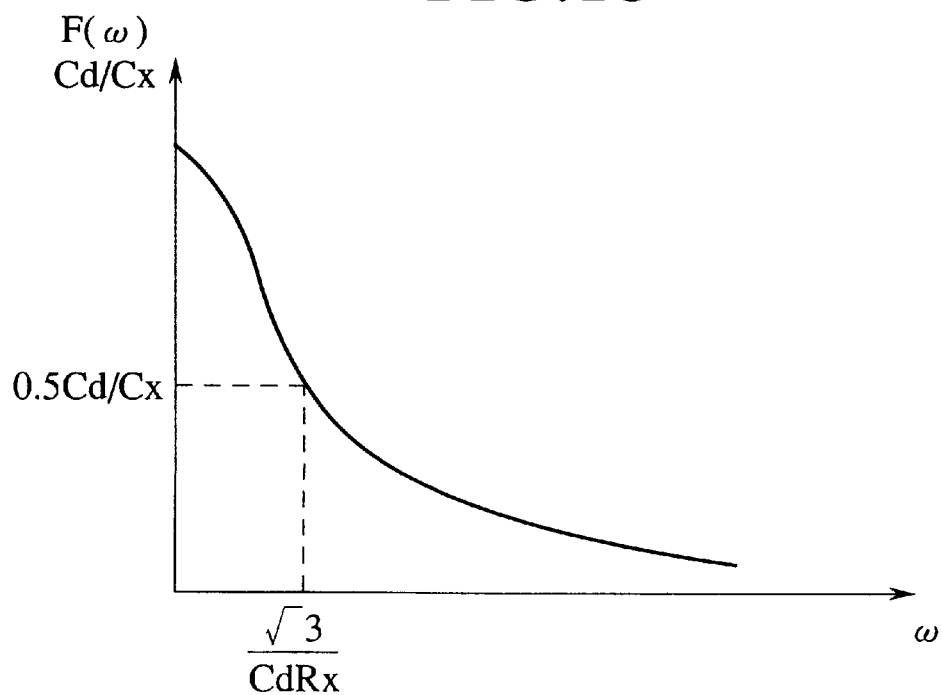
FIG. 18 is a characteristic diagram showing a transfer function of the integration circuit shown in FIG. 15.

If s=jω, the formula (7) becomes the formula (8), so that its frequency characteristic can be obtained.

$$F(\omega)=(1/Cx \cdot Rx)[1/SQR(\omega^2+(1/Cd \cdot Rx)^2) \quad (8)$$

where ω is an angular frequency. If the formula (8) is represented as a drawing, it can be expressed as shown in FIG. 18, so that it is evident from the frequency characteristic that the high frequency component of noise has been reduced. That is, from the formula (8), it is evident that the integration circuit 116 reduces the high frequency component of noise. This frequency characteristic is that the gain becomes half at a position of $\omega=\sqrt{3}/(Cd \cdot Rx)$ and for example, the gain asymptotically comes near 0 as the frequency becomes higher as shown in FIG. 18.

Hereinafter, this circuit will be described with reference to concrete parameters thereof. A case in which a picture element Cp is formed in the matrix of 1000×1000, the X-ray of 10 ms is irradiated in a second and a frame rate of 30 frames is applied to collect pictures is exemplified.

Assuming that the picture element Cp is actuated to collect electric charge in an interval in which the X-ray is irradiated, and that an operation for reading electric charge is carried out after the X-ray exposure, it is necessary to collect a picture at 23 ms per frame. Because the picture element circuits 123 of 1000 picture elements are connected to a signal line, signal collection of each picture element must be carried out in 23 μs. Here, it is assumed that a time until the electric charge is read out and sampled after the switching element (TFT) 111 is turned on is set to about 20μ.

Although the Rt of the switching element 111 is changed depending on the electric charge Q as described above, it is assumed that 2 MΩ>Rt>1 MΩ. Although the Cs is difficult to control because it is a stray capacitance, it is assumed that it is about 50 pF. In this case, the resistance of FIG. 15 and constant of the capacitor are set as follows.

Cp=1 pF
Cd=50 pF
Cf=10 pF
Cx=10 pF
Rx=50 kΩ

Figure 1:
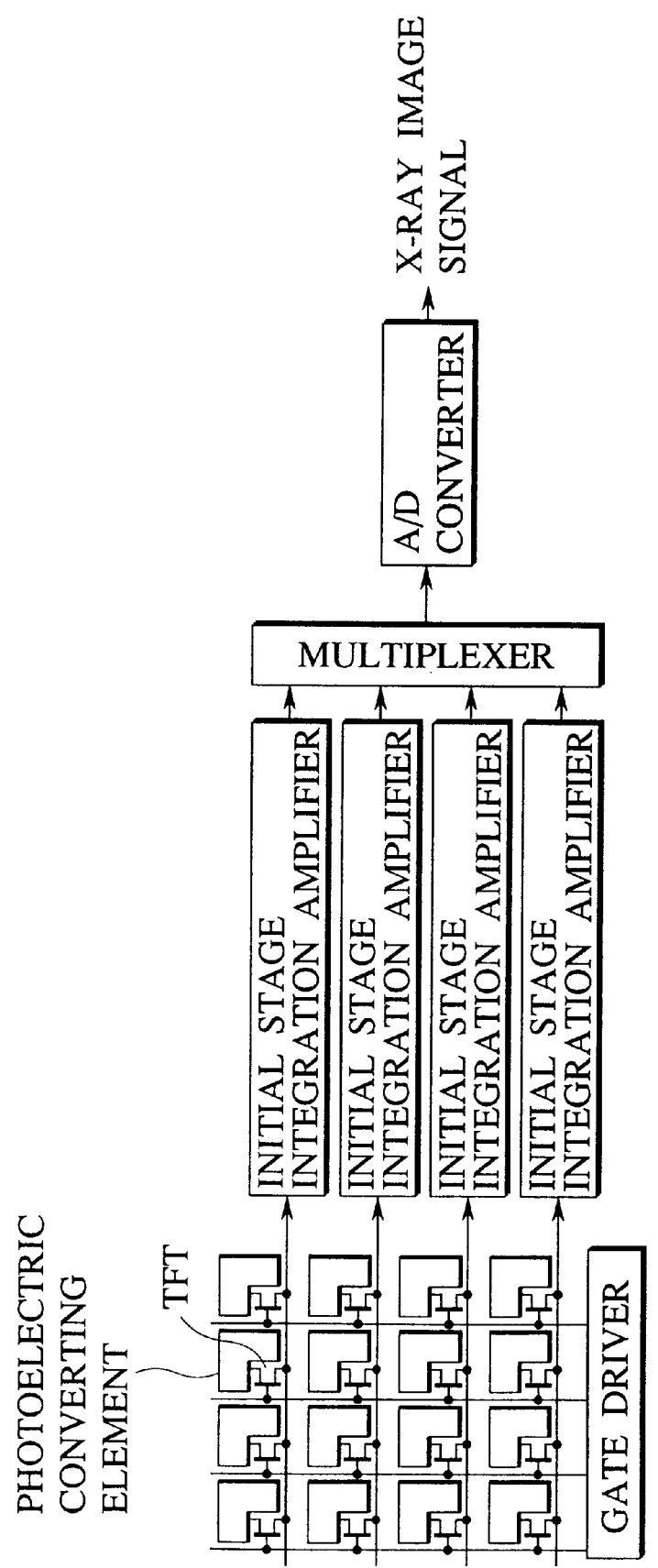
FIG. 1 is a block diagram showing a structure of a conventional X-ray solid flat panel detector.
Figure 2:
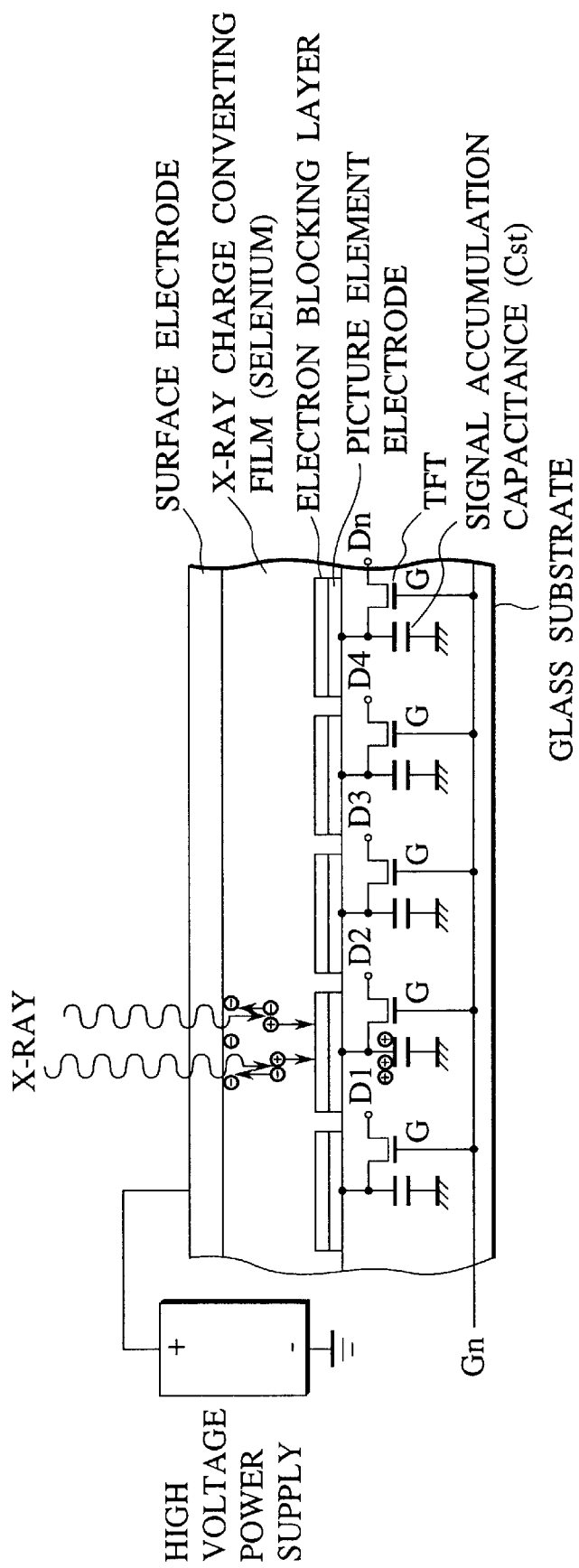
FIG. 2 is a schematic sectional view showing a structure of a picture element portion of a direct conversion type X-ray solid flat panel detector.
Figure 3A:
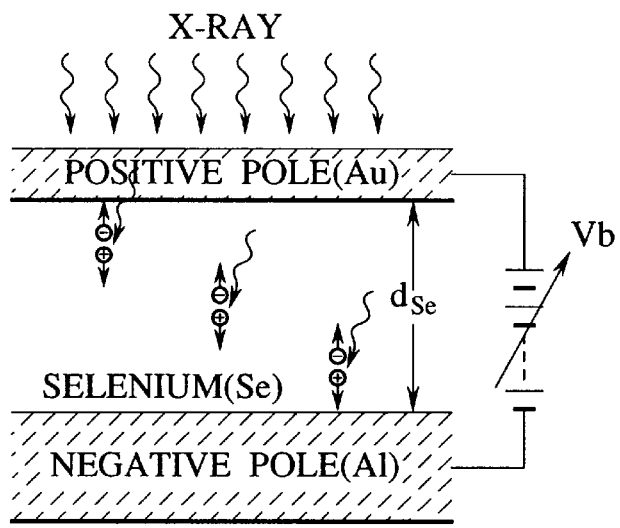
FIG. 3A is a sectional view of amorphous-selenium (a-Se)
Figure 3B:
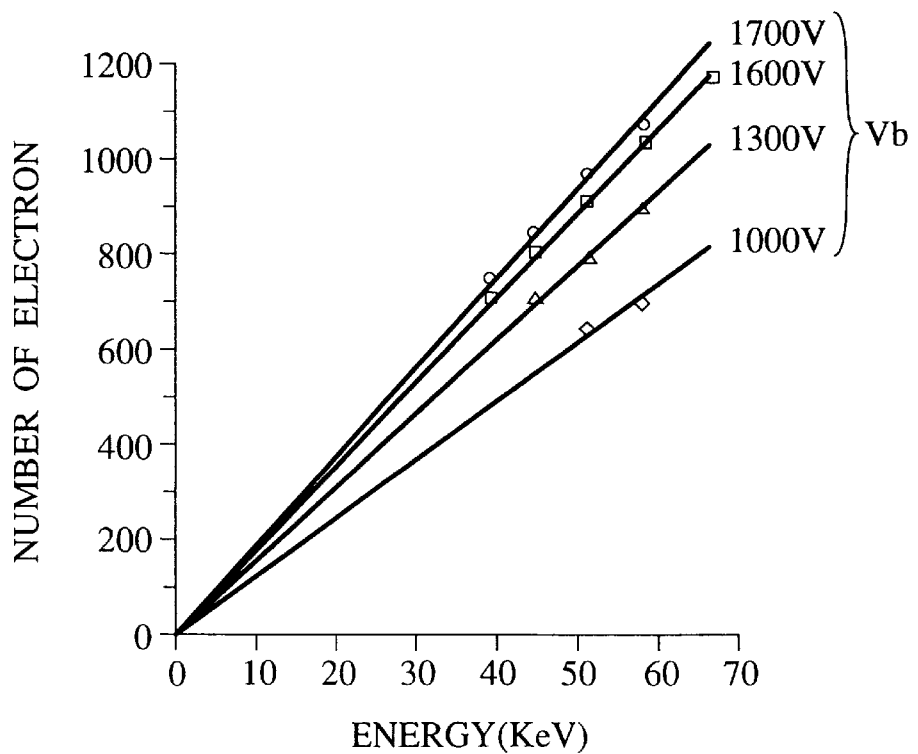
FIG. 3B is a diagram showing changes of the number of generated electrons per unit absorption energy in case when bias voltage Vb is changed with respect to the amorphous-selenium shown in FIG. 3A.
Figure 4:
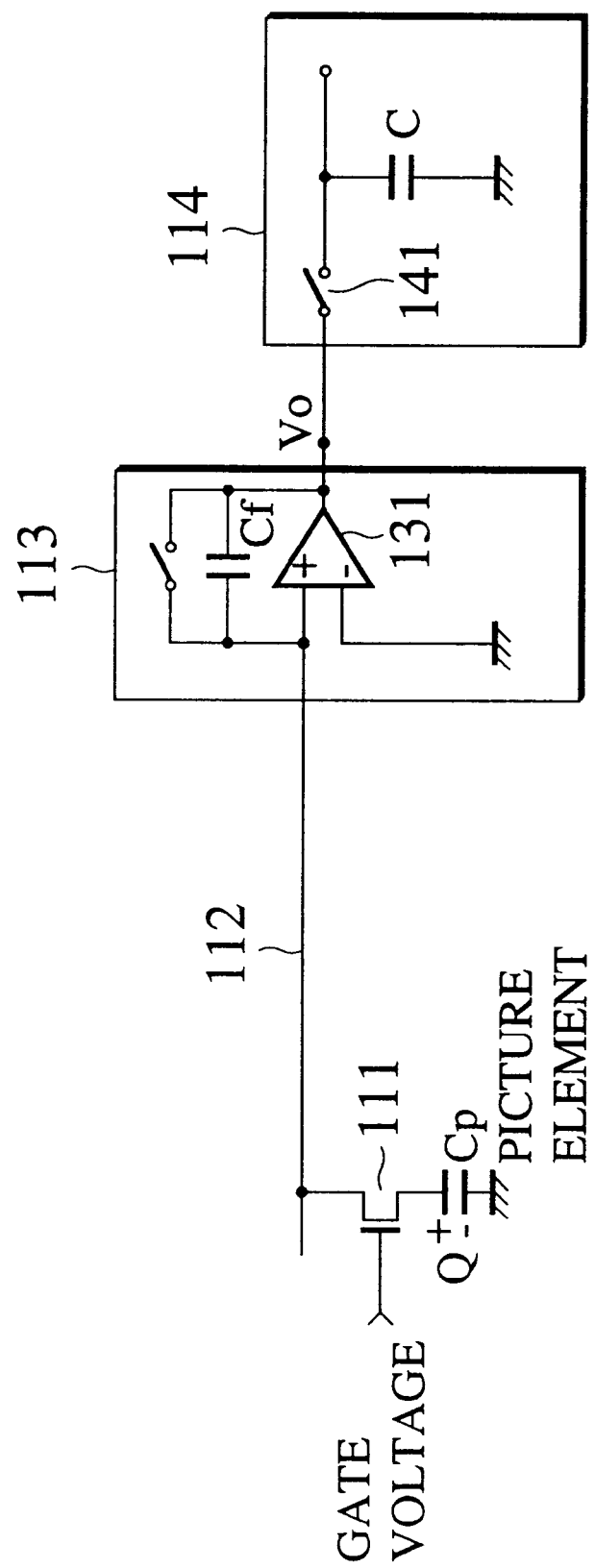
FIG. 4 is a block diagram showing a structure of a conventional X-ray solid flat panel detector of a picture element circuit.
Figure 5:
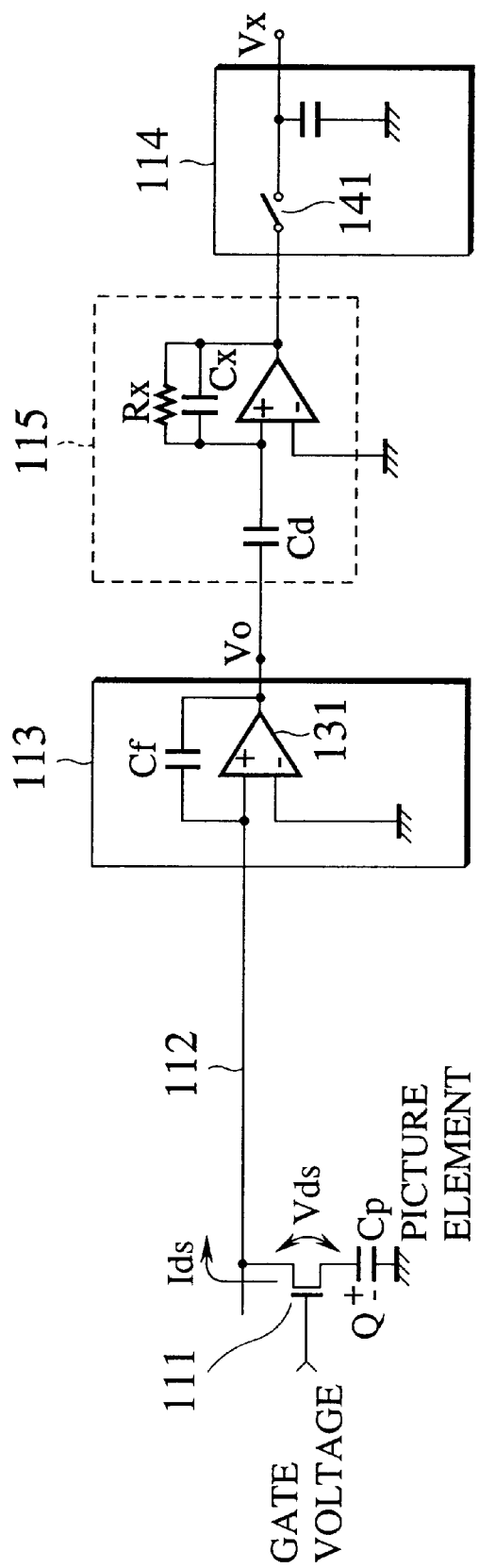
FIG. 5 is a block diagram showing other structure of a conventional X-ray solid flat panel detector.
Figure 6A:
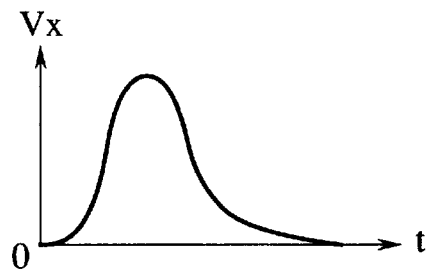
FIGS. 6A, 6B are characteristic diagrams respectively showing a waveform of voltages Vx and Vo shown in FIG. 5 with a passage of time.
Figure 6B:
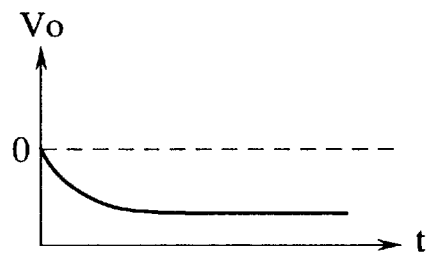

In the above setting, Cp·Rt=1–2 μs, Cd·Rx=2.5 μs and the signal component of Vx converges to a specific value 20μ after. Meanwhile, although the Vx is multiplied by Cd/Cx as compared to the output voltage Vo of the conventional example of FIG. 4 having no integration circuit 116, a signal five times larger can be detected if the above value is selected. Because if the signal is large, resistance to noise caused in a subsequent circuit is improved, an advantage of noise resistance is generated by the above setting.

The noise Nx generated by the integration amplifier 113 is reduced as follows, according to FIG. 18.

| Noise frequency (MHz) | F(w) |
| --- | --- |
| 0.5 | 0.127 |
| 1.0 | 0.064 |
| 1.5 | 0.042 |
| 2.0 | 0.032 |

That is, the noise generated by the integration amplifier 3 is reduced as the frequency becomes higher while the signal is increased five times. The S/N ratio is very high and, for example, at the noise frequency of 1 MHz, the S/N ratio is improved about 16 times. Therefore, if a circuit is formed with the parameters exemplified here, and after the switching element 111 is turned on, the sampling switch 141 is turned on/off 20 μs after so as to hold the voltage, the signal whose S/N ratio has been improved can be digitized, so that noise of a weak signal generated by weak X-ray can be reduced so as to produce an image.

According to this embodiment, because the voltage Vx output from the integration circuit 116 can be protected from an influence of the resistor Rt of the switching element 111 by sample holding the electric charge Q at an appropriate timing after it is read out from the picture element Cp, the voltage Vx converged to a certain value can be held by the sample/hold circuit 114 stably and securely. Further, because the integration circuit 116 has a frequency characteristic shown in FIG. 18, the high frequency noise generated by the integration amplifier 113 can be reduced so that the S/N ratio of the read signal can be improved. As a result, at the time of weak X-ray irradiation, a clear X-ray taken image can be obtained.

As a modification of the fifth embodiment shown in FIG. 15, it is possible to omit the operational amplifier 162 and the coupling capacitor Cd. That is, the resistor Rx is connected to the capacitor Cx through each end thereof and the other end of the resistor Rx is connected to the integration amplifier 113 and the other end of the capacitor Cx is grounded.

If the resistor Rx and coupling capacitor C are a variable resistor and a variable capacitance, respectively, and the reading control circuit 118 controls a timing of the sample/hold circuit 114 to sample hold an output of the integration circuit 116 depending on a resistance and capacitance of the variable resistor and variable capacitance, a further advantage can be obtained.

Figure 19:
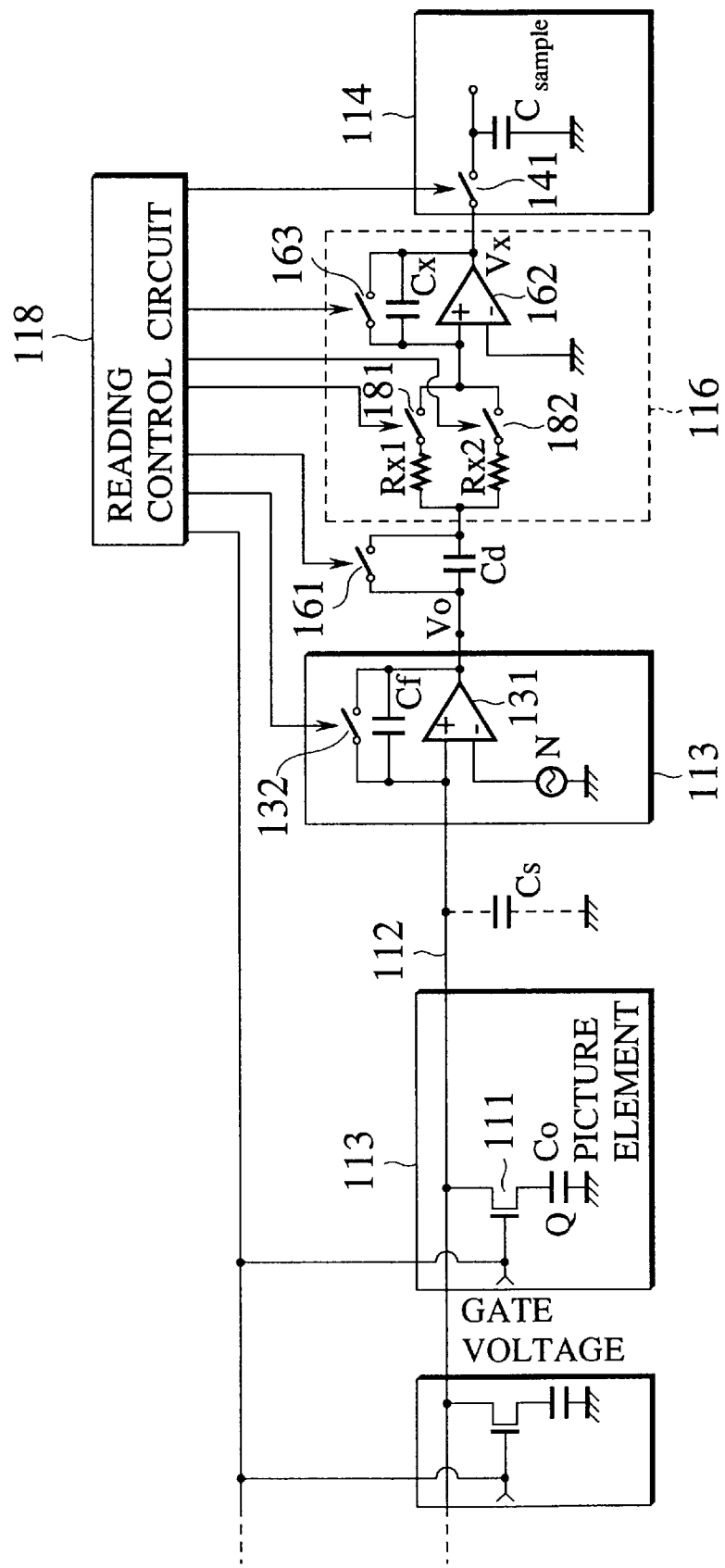
FIG. 19 is a block diagram for showing a sixth embodiment of the X-ray solid flat panel detector of the present invention.

FIG. 19 is a block diagram showing a sixth embodiment of the X-ray solid flat panel detector of the present invention. The same reference numerals are used for the same component as the fifth embodiment shown in FIG. 15 and a description thereof is omitted. According to this embodiment, as a resistor inserted between the coupling capacitor Cd and operational amplifier 162, Rx1 having a small resistance and Rx2 having a large resistance are provided and any one of them is selected depending on mode by switches 181, 182 by the reading control circuit 118. The other structure is the same as the fifth embodiment shown in FIG. 15.

Next, an operation of this embodiment will be described. For example, in case of a long hour observation under the X-ray fluoroscopy, not so high spatial resolution is demanded but reduction of exposure is sometimes more important. In this case, although a procedure for reducing the exposure amount by half is taken, because the electric charge accumulated in the picture element is also reduced by half, the S/N ratio of a read signal is worsened.

In case when the reduction of exposure is carried out as described above, a switch 182 is turned on and the S/N ratio is improved by using the resistor Rx2. In this Figure, Rx1 denotes a 50 kΩ resistor exemplified in the fifth embodiment and Rx2 denotes a 100 kΩ resistor. In case of exposure reduction mode, the Rx2 is selected and actuated.

Figure 20A:
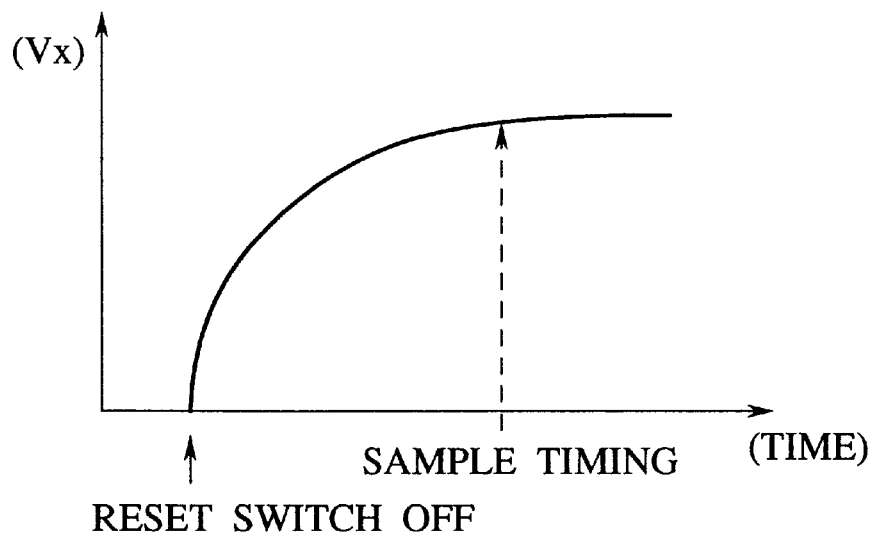
FIGS. 20A, 20B are characteristic diagrams each showing a waveform of the voltage Vx shown in FIG. 19 with a passage of time.
Figure 20B:

If the Rx value is increased, the time constant of the circuit increases, so that as compared to FIG. 20A, the shape of F(ω) is changed as shown in FIG. 20B thereby making it possible to ensure a reduction effect against small level noise frequency. That is, if the time constant increases, the integration effect of the integration circuit 116 is improved so that the noise reduction effect is increased. Therefore, the S/N ratio of the voltage Vx which is an output of the integration circuit 116 is improved. However, if the resistance Rx is increased, the time constant of the signal of the voltage Vx is increased as shown in FIG. 20B, and therefore, it is necessary to relatively extend a time up to sampling start after the switching element 111 is turned on by 40 μS.

For this purpose, the switching elements of the adjacent two picture elements Cp are controlled to be turned on at the same time by the reading control circuit 118 in order to reduce the spatial resolution by half so as to have a resolution of 500×500 and 500 picture elements are read out in a single line.

In case when the X-ray exposure is normal level, the switch 181 is turned on so as to select the resistor Rx1. In this case, like the fifth embodiment, the output voltage Vx of the integration circuit 118 is as shown in FIG. 20A so that the picture element can be read out in 20 μS and a resolution of 1000×1000 can be obtained.

According to this embodiment, the exposure reduction mode can be selected. In this case, by setting the Rx value to be twice the normal mode, turning the switching element 111 in on state and then sampling 40 μS after, a signal whose S/N ratio is improved can be obtained. The other effect is the same as the fifth embodiment shown in FIG. 15. Because the above time constant can be changed by changing the Cd value, the same operation and effect as above described can be obtained by changing the Cd value.

Figure 21:
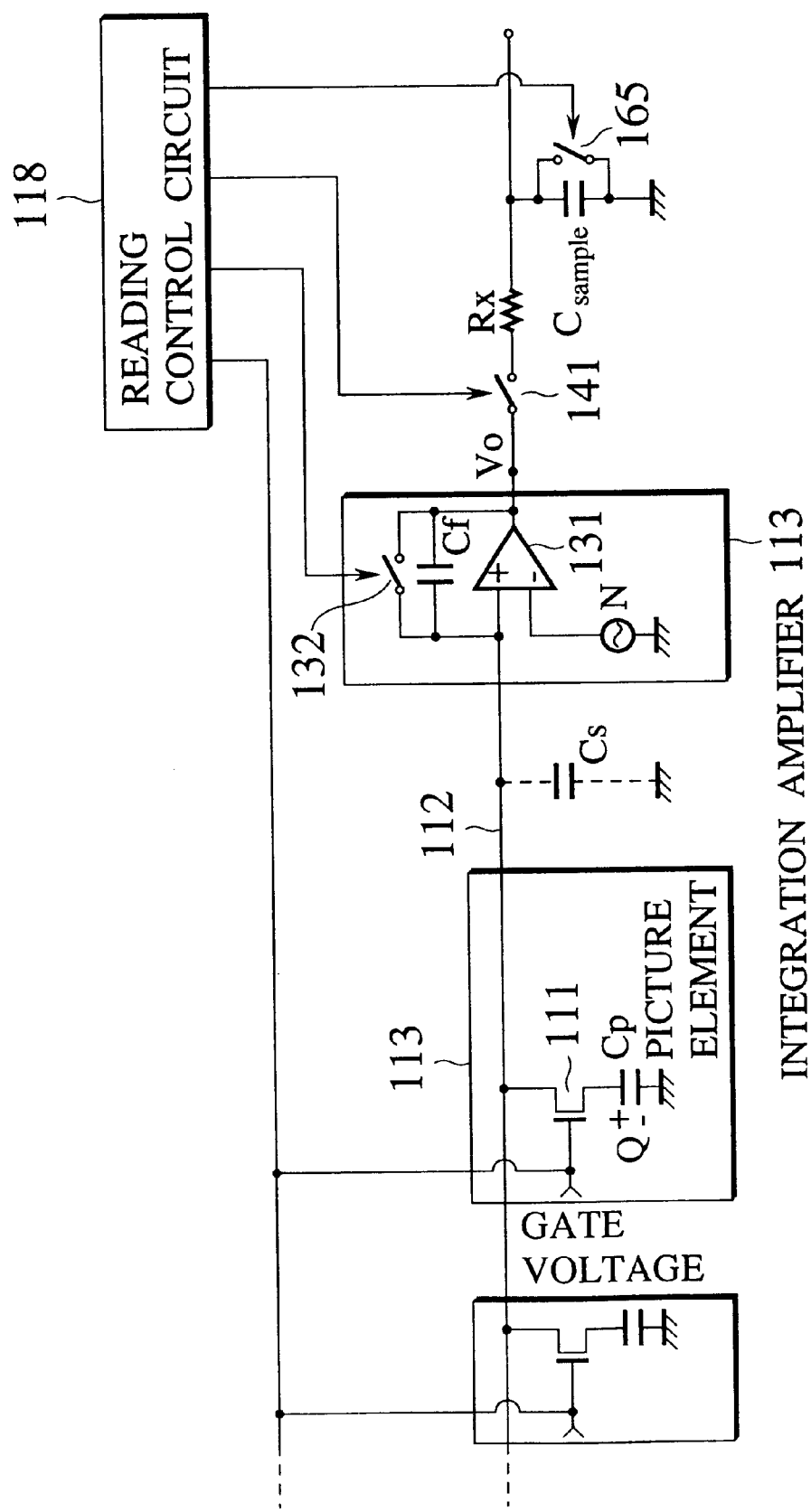
FIG. 21 is a block diagram for showing a seventh embodiment of the X-ray solid flat panel detector of the present invention.

FIG. 21 is a block diagram showing a seventh embodiment of the X-ray detector of the present invention. The same reference numerals are used for the same components as the fifth embodiment and a description thereof is omitted. According to this embodiment, an integration circuit for reducing noise subsequent to the integration amplifier 113 comprises a resistor Rx and a capacitor $C_{sample}$ and a reset switch 165 is connected in parallel to this capacitor $C_{sample}$ and opened/closed by the reading control circuit 118. That is, the resistor Rx and capacitor $C_{sample}$ act as an integration circuit for reducing noise and sample/hold circuit at the same time. With such a structure also, the integration circuit can be provided with the frequency characteristic shown in FIG. 18 and the same high frequency noise reduction effect as the fifth embodiment shown in FIG. 15 is produced. Although according to this embodiment, a sampling SW 141 needs to be kept on in an interval in which the noise is sufficiently reduced, because the circuit structure becomes simple, it is possible to produce an X-ray detector at a low price.

Although the reset SW 165 inserted in parallel to the $C_{sample}$ in the same Figure is not always required, in a region in which the X-ray distribution changes suddenly, for example, in case in which an extremely bright region and an extremely dark region are disposed adjacent to each other, preferably, the picture element accumulated just before is completely reset and then a next picture element is read out. This example is shown here.

The sixth embodiment can be applied to the seventh embodiment. That is, in the seventh embodiment, the resistor Rx can be composed of two resistors Rx1 and Rx2 like the sixth embodiment. With such a structure, the effect of the sixth embodiment can be obtained in the seventh embodiment.

As described above, according to the fifth to seventh embodiment, by integrating an electric charge taken out from the picture element to convert that electric charge to a voltage and further integrating to reduce noise, even if the voltage and current characteristics of the switching element for taking out the electric charge of the picture element is non-linear, the electric charge can be read out securely at a constant sample timing. As a result, to reduce exposure of the specimen to the X-ray, a noise of weak signal generated by weak X-ray is reduced so that an image having an excellent S/N ration can be obtained.

Although, the above respective embodiments have been described with only the X-ray, the present invention is not restricted to the X-ray in viewpoint of a gist thereof but can be applied to a wide range of radiation.

It should be understood that many modifications and adaptations of the invention will become apparent to those skilled in the art and it is intended to encompass such obvious modifications and changes in the scope of the claims appended hereto.

What is claimed is:

1. A radiation detector comprising:

photoelectric converting means disposed in a matrix for converting radiation impinging through a specimen to electric charge and accumulating the electric charge;

reading means for reading the electric charge accumulated in said photoelectric means;

a pre-processing circuit for integrating the electric charge read out from said photoelectric means through said reading means to convert to a voltage;

an A/D converter for converting an analog voltage signal output from said pre-processing circuit to a digital signal; and a control means for controlling a change in an amplification degree of said pre-processing circuit depending on a radiation irradiation condition.

2. A radiation detector according to claim 1, wherein said pre-processing circuit contains a plurality of amplifiers for carrying out amplifications and said control means changes said amplification degree by validating any number of amplifiers of said plurality of the amplifiers.

3. A radiation detector according to claim 1, wherein said pre-processing circuit includes a low frequency component extracting circuit for extracting a low frequency component from a voltage signal obtained by integrating the electric charge read out from said photoelectric converting means and said control means sets a gain and an offset in an amplification so as to suppress the low frequency component depending on the extracted low frequency component.

4. A radiation detector according to claim 1, wherein said control means changes the amplification degree of said pre-processing circuit depending on a dose of radiation impinging upon said photoelectric converting means according to said radiation irradiation condition.

5. A radiation detector according to claim 4, wherein said radiation irradiation condition includes a condition of which fluoroscopy or radiography is selected.

6. A radiation detector according to claim 4, wherein said radiation irradiation condition includes a portion of the specimen exposed to radiation.

7. A radiation detector according to claim 1, wherein said control means comprises a memory means for storing setting information for changing the amplification degree of said pre-processing circuit depending on said radiation irradiation condition.

8. A radiation detector comprising:

a photoelectric converting means disposed in a matrix for converting radiation impinging through a specimen to electric charge and accumulating the electric charge;

a bias electrode for applying a bias voltage to the photoelectric converting means;

a reading means for reading the electric charge accumulated in said photoelectric converting means;

a pre-processing circuit for integrating the electric charge read out from said photoelectric means through said reading means to convert to a voltage;

an A/D converter for converting an analog voltage signal output from said pre-processing circuit to a digital signal;

a bias voltage generating means for supplying said bias voltage to said bias electrode; and a control means for changing said bias voltage generated by said bias voltage generating means depending on a radiation irradiation condition.

9. A radiation detector according to claim 8, further comprising: a maximum/minimum detecting portion for detecting a maximum value and a minimum value of an output of said pre-processing circuit, wherein said control means changes said bias voltage generated by said bias voltage generating means depending on the maximum value and minimum value detected by said maximum/minimum detecting portion.

10. A radiation detector comprising:

a photoelectric converting means disposed in a matrix for converting radiation impinging through a specimen to electric charge and accumulating the electric charge;

a reading means for reading the electric charge accumulated in said photoelectric converting means;

an integration amplifier for integrating the electric charge read out from said photoelectric converting means through said reading means to convert to a voltage;

an integration circuit for inputting and integrating an output of said integration amplifier;

a sample/hold circuit for sample-holding an output of the integration circuit; and a control circuit for controlling a reading timing of said reading means.

11. A radiation detector according to claim 10, wherein said control circuit controls said sample/hold circuit to sample-hold the output of said integration circuit after a predetermined time elapses after a timing of reading start by said reading means.

12. A radiation detector according to claim 10, further comprising a coupling capacitor for connecting said integration amplifier to said integration circuit, wherein said integration circuit comprises an operational amplifier; a resistor having an end connected to said coupling capacitor and the other end connected to a positive feedback input terminal of said operational amplifier; and a capacitor having an end connected to said positive feedback input terminal and the other end connected to an output terminal of said operational amplifier, and said resistor, said coupling capacitor and said capacitor have a resistance and a capacitance for reducing the frequency characteristic of a circuit comprising said coupling capacitor and said integration circuit at a high frequency side thereof.

13. A radiation detector according to claim 10, wherein said integration circuit comprises a resistor having an end connected to said integration amplifier and the other end connected to a capacitor and said capacitor having an end connected to said resistor and the other end connected to ground, and said resistor and said capacitor have a resistance and a capacitance for reducing the frequency characteristic of a circuit comprising said integration circuit at a high frequency side thereof.

14. A radiation detector according to claim 10, wherein said integration circuit comprises a resistor, and said resistor and a capacitor forming said sample/hold circuit have a resistance and a capacitance for reducing the frequency characteristic of a circuit comprising said integration circuit and said sample/hold circuit at a high frequency side thereof.

15. A radiation detector according to claim 12, wherein said resistor comprises two resistors connected in parallel and having different resistances from each other.

16. A radiation detector according to claim 12, further comprising reset switches respectively connected to said coupling capacitor and said capacitor in parallel for discharging electric charges accumulated in said coupling capacitor and said capacitor, wherein said control circuit turns on/off said reset switches at timings different by a predetermined phase with timings of reading start and end by said reading means.

17. A radiation detector according to claim 12, wherein said resistor and said coupling capacitor are a variable resistor and a variable capacitance respectively, and said control circuit controls a timing of said sample/hold circuit to sample-hold an output of said integration circuit depending on a resistance and a capacitance of said variable resistor and said variable capacitance respectively.

18. A radiation detector according to claim 13, wherein said resistor comprises two resistors connected in parallel and having different resistances from each other.

19. A radiation detector according to claim 14, wherein said resistor comprises two resistors connected in parallel and having different resistances from each other.

20. A radiation detecting method comprising the steps of:

converting radiation impinging through a specimen to electric charge and accumulating the electric charge;

reading the accumulated electric charge at a predetermined timing;

integrating read out electric charge to a voltage;

passing an signal relating to the voltage through a integrating circuit; and sample-holding a signal output from the integration circuit after a predetermined time elapses after said predetermined timing.

21. An X-ray diagnosing apparatus comprising:
an X-ray tube for irradiating X-ray to a specimen;
a radiation detector including:
  a radiation detector comprising:
    photoelectric converting means disposed in a matrix for converting radiation impinging through a specimen to electric charge and accumulating the electric charge,
  reading means for reading the electric charge accumulated in said photoelectric means,
    a pre-processing circuit for integrating the electric charge read out from said photoelectric means through said reading means to convert to a voltage,
    an A/D converter for converting an analog voltage signal output from said pre-processing circuit to a digital signal, and
    a control means for controlling a change in an amplification degree of said pre-processing circuit depending on a radiation irradiation condition;
an image memory for accumulating a digital signal output from said radiation detector as image information; and
a display means for displaying an image relating to said image information.

22. An X-ray diagnosing apparatus comprising:
an X-ray tube for irradiating X-ray to a specimen;
a radiation detector including:
  a radiation detector comprising:
    a photoelectric converting means disposed in a matrix for converting radiation impinging through a specimen to electric charge and accumulating the electric charge;
    a reading means for reading the electric charge accumulated in said photoelectric converting means;
    an integration amplifier for integrating the electric charge read out from said photoelectric converting means through said reading means to convert to a voltage;
    an integration circuit for inputting and integrating an output of said integration amplifier;
    a sample/hold circuit for sample-holding an output of the integration circuit; and
    a control circuit for controlling a reading timing of said reading means;
an image memory for accumulating a digital signal output from said radiation detector as image information; and
a display means for displaying an image relating to said image information.

23. A radiation detector comprising:
photoelectric converting means disposed in a matrix for converting radiation impinging through a specimen to electric charge and accumulating the electric charge;
reading means for reading the electric charge accumulated in said photoelectric means;
a pre-processing circuit for integrating the electric charge read out from said photoelectric means through said reading means to convert to a voltage;
an A/D converter for converting an analog voltage signal output from said pre-processing circuit to a digital signal; and
a control means for controlling a change in an integration constant of said pre-processing circuit depending on a radiation irradiation condition.

24. A radiation detector according to claim 23, wherein said control means changes the integration constant of said pre-processing circuit depending on a dose of radiation impinging upon said photoelectric converting means according to said radiation irradiation condition.

25. A radiation detector according to claim 23, wherein said control means comprises a memory means for memorizing setting information for changing the integration constant of said pre-processing circuit depending on said radiation irradiation condition.

26. A radiation detector according to claim 24, wherein said radiation irradiation condition includes a condition of which fluoroscopy or radiography is selected.

27. A radiation detector according to claim 24, wherein said radiation irradiation condition includes a portion of the specimen exposed to radiation.

28. An X-ray diagnosing apparatus comprising:
an X-ray tube for irradiating X-ray to a specimen;
a radiation detector including:
  photoelectric converting means disposed in a matrix for converting radiation impinging through a specimen to electric charge and accumulating the electric charge,
  reading means for reading the electric charge accumulated in said photoelectric means,
    a pre-processing circuit for integrating the electric charge read out from said photoelectric means through said reading means to convert to a voltage,
    an A/D converter for converting an analog voltage signal output from said pre-processing circuit to a digital signal, and
    a control means for controlling a change in an integration constant of said pre-processing circuit depending on a radiation irradiation condition;
an image memory for accumulating a digital signal output from said radiation detector as image information; and
a display means for displaying an image relating to said image information.

29. A radiation detector comprising:
a photoelectric converter disposed in a matrix and configured to convert radiation impinging through a specimen to electric charge and to accumulate the electric charge;
a reading mechanism configured to read the electric charge accumulated in said photoelectric converter;
a pre-processing circuit configured to integrate the electric charge read out from said photoelectric converter through said reading mechanism to convert to a voltage;

an A/D converter configured to convert an analog voltage signal output from said pre-processing circuit to a digital signal; and a control unit configured to control a change in an amplification degree of said pre-processing circuit depending on a radiation irradiation condition.

30. A radiation detector according to claim 29, wherein said pre-processing circuit includes a plurality of amplifiers configured to perform amplifications, and wherein said control unit changes said amplification degree by validating any number of amplifiers of said plurality of the amplifiers.

31. A radiation detector according to claim 29, wherein said pre-processing circuit includes a low frequency component extracting circuit configured to extract a low frequency component from a voltage signal obtained by integrating the electric charge read out from said photoelectric converter, and wherein said control unit sets a gain and an offset in an amplification so as to suppress the low frequency component depending on the extracted low frequency component.

32. A radiation detector according to claim 29, wherein said control unit changes the amplification degree of said pre-processing circuit depending on a dose of radiation impinging upon said photoelectric converter according to said radiation irradiation condition.

33. A radiation detector according to claim 29, wherein said control unit comprises a memory configured to store setting information for changing the amplification degree of said pre-processing circuit depending on said radiation irradiation condition.

34. A radiation detector according to claim 32, wherein said radiation irradiation condition includes a condition of which fluoroscopy or radiography is selected.

35. A radiation detector according to claim 32, wherein said radiation irradiation condition includes a portion of the specimen exposed to radiation.

36. A radiation detector comprising:

a photoelectric converter disposed in a matrix and configured to convert radiation impinging through the specimen to electric charge and to accumulate the electric charge;

a bias electrode configured to apply a bias voltage to the photoelectric converter unit;

a reading mechanism configured to read the electric charge accumulated in said photoelectric converting unit;

a pre-processing circuit configured to integrate the electric charge read out from said photoelectric converter through said reading mechanism to convert to a voltage;

an A/D converter configured to convert an analog voltage signal output from said pre-processing circuit to a digital signal;

a bias voltage generating mechanism configured to supply said bias voltage to said bias electrode; and a control unit configured to change said bias voltage generated by said bias voltage generating mechanism depending on a radiation irradiation condition.

37. A radiation detector according to claim 36, further comprising:

a maximum/minimum detecting portion configured to detect a maximum value and a minimum value of an output of said pre-processing circuit, wherein said control unit changes said bias voltage generated by said bias voltage generating mechanism depending on the maximum value and minimum value detected by said maximum/minimum detecting portion.

38. A radiation detector comprising:

a photoelectric converter disposed in a matrix and configured to convert radiation impinging through a specimen to electric charge and to accumulate the electric charge;

a reading mechanism configured to read the electric charge accumulated in said photoelectric converter;

an integration amplifier configured to integrate the electric charge read out from said photoelectric converter through said reading mechanism to convert to a voltage;

an integration circuit configured to input and integrate an output of said integration amplifier;

a sample/hold circuit configured to sample-hold an output of the integration circuit; and a control circuit configured to control a reading timing of said reading mechanism.

39. A radiation detector according to claim 38, wherein said control circuit controls said sample/hold circuit to sample-hold the output of said integration circuit after a predetermined time elapses after a reading start time by said reading mechanism.

40. A radiation detector according to claim 38, further comprising:

a coupling capacitor configured to connect said integration amplifier to said integration circuit, wherein said integration circuit comprises:
an operational amplifier;
a resistor having an end connected to said coupling capacitor and the other end connected to a positive feedback input terminal of said operational amplifier; and
a capacitor having an end connected to said positive feedback input terminal and the other end connected to an output terminal of said operational amplifier, and wherein said resistor, said coupling capacitor and said capacitor have a resistance and a capacitance configured to reduce the frequency characteristic of a circuit comprising said coupling capacitor and said integration circuit at a high frequency side thereof.

41. A, radiation detector according to claim 38, wherein said integration circuit comprises a resistor having an end connected to said integration amplifier and the other end connected to a capacitor and said capacitor having an end connected to said resistor and the other end connected to ground, and wherein said resistor and said capacitor have a resistance and a capacitance configured to reduce the frequency characteristic of a circuit comprising said integration circuit at a high frequency side thereof.

42. A radiation detector according to claim 38, wherein said integration circuit comprises a resistor, and wherein said resistor and a capacitor forming said sample/hold circuit have a resistance and a capacitance configured to reduce the frequency characteristic of a circuit comprising said integration circuit and said sample/hold circuit at a high frequency side thereof.

43. A radiation detector according to claim 40, wherein said resistor comprises two resistors connected in parallel and having different resistances from each other.

44. A radiation detector according to claim 40, further comprising:

reset switches respectively connected to said coupling capacitor and said capacitor in parallel and configured to discharge electric charges accumulated in said coupling capacitor and said capacitor, wherein said control circuit turns on/off said reset switches at timings different by a predetermined phase with reading start and end times by said reading means.

45. A radiation detector according to claim 40, wherein said resistor and said coupling capacitor are a variable resistor and a variable capacitance respectively, and wherein said control circuit controls a timing of said sample/hold circuit to sample-hold an output of said integration circuit depending on a resistance and a capacitance of said variable resistor and said variable capacitance respectively.

46. A radiation detector according to claim 41, wherein said resistor comprises two resistors connected in parallel and having different resistances from each other.

47. A radiation detector according to claim 42, wherein said resistor comprises two resistors connected in parallel and having different resistances from each other.

48. An X-ray diagnosing apparatus comprising:

an X-ray tube configured to irradiate X-ray to a specimen;

a radiation detector including:

a photoelectric converter disposed in a matrix and configured to convert radiation impinging through a specimen to electric charge and to accumulate the electric charge, a reading mechanism configured to read the electric charge accumulated in said photoelectric converter;

a pre-processing circuit configured to integrate the electric charge read out from said photoelectric converter through said reading mechanism to convert to a voltage;

an A/D converter configured to convert an analog voltage signal output from said pre-processing circuit to a digital signal; and a control unit configured to control a change in an amplification degree of said preprocessing circuit depending on a radiation irradiation condition;

an image memory configured to accumulate a digital signal output from said radiation detector as image information; and a display configured to display an image relating to said image information.

49. An X-ray diagnosing apparatus comprising:

an X-ray tube configured to irradiate X-ray to a specimen;

a radiation detector including:

a photoelectric converter disposed in a matrix and configured to convert radiation impinging through a specimen to electric charge and to accumulate the electric charge, a reading mechanism configured to read the electric charge accumulated in said photoelectric converter, an integration amplifier configured to integrate the electric charge read out from said photoelectric converter through said reading mechanism to convert to a voltage, an integration circuit configured to input and integrate an output of said integration amplifier, a sample/hold circuit configured to sample-hold an output of the integration circuit, and a control circuit configured to control a reading timing of said reading mechanism, an image memory configured to accumulate a digital signal output from said radiation detector an image information; and a display configured to display an image relating to said image information.

50. A radiation detector comprising:

a photoelectric converter disposed in a matrix and configured to convert radiation impinging through a specimen to electric charge and to accumulate the electric charge;

a reading mechanism configured to read the electric charge accumulated in said photoelectric converter;

a pre-processing circuit configured to integrate the electric charge read out from said photoelectric converter through said reading mechanism to convert to a voltage;

an A/D converter configured to convert an analog voltage signal output from said pre-processing circuit to a digital signal; and a control unit configured to control a change in an integration constant of said pre-processing circuit depending on a radiation irradiation condition.

51. A radiation detector according to claim 50, wherein said control unit changes the integration constant of said pre-processing circuit depending on a dose of radiation impinging upon said photoelectric converter according to said radiation irradiation condition.

52. A radiation detector according to claim 50, wherein said control unit comprises a memory configured to store setting information for changing the integration constant of said pre-processing circuit depending on said radiation irradiation condition.

53. A radiation detector according to claim 51, wherein said radiation irradiation condition includes a condition of which fluoroscopy or radiography is selected.

54. A radiation detector according to claim 51, wherein said radiation irradiation condition includes a portion of the specimen exposed to radiation.

55. An X-ray diagnosing apparatus comprising:

an X-ray tube configured to irradiate X-ray to a specimen;

a photoelectric converter disposed in a matrix and configured to convert radiation impinging through a specimen to electric charge and to accumulate the electric charge;

a reading mechanism configured to read the electric charge accumulated in said photoelectric converter;

a pre-processing circuit configured to integrate the electric charge read out from said photoelectric converter through said reading mechanism to convert to a voltage;

an A/D converter configured to convert an analog voltage signal output from said pre-processing circuit to a digital signal;

a control unit configured to control a change in an integration constant of said pre-processing circuit depending on a radiation irradiation condition, an image memory configured to accumulate a digital signal output from said radiation detector as image information; and a display configured to display an image relating to said image information.

* * * * *